United States Patent
Natsuno

(10) Patent No.: US 7,373,159 B2
(45) Date of Patent: May 13, 2008

(54) APPARATUS AND METHOD FOR MEDIATING BETWEEN CALLERS AND RECEIVERS USING MOBILE PHONES

(75) Inventor: Takeshi Natsuno, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 79 days.

(21) Appl. No.: 11/193,827

(22) Filed: Jul. 28, 2005

(65) Prior Publication Data

US 2005/0261013 A1    Nov. 24, 2005

Related U.S. Application Data

(63) Continuation of application No. 10/258,985, filed on Oct. 30, 2002, now Pat. No. 7,069,028.

(30) Foreign Application Priority Data

Feb. 6, 2001  (JP)  ............................. 2001-030047

(51) Int. Cl.
*H04Q 7/20* (2006.01)
(52) U.S. Cl. ..................................................... 455/466
(58) Field of Classification Search ................ 455/466, 455/414.1, 426.1
See application file for complete search history.

(56) References Cited

U.S. PATENT DOCUMENTS

| 5,862,223 A | 1/1999 | Walker et al. |
| 6,047,053 A | 4/2000 | Miner et al. |
| 6,064,874 A | 5/2000 | Cox et al. |
| 6,128,646 A | 10/2000 | Miloslavsky |
| 6,236,365 B1 | 5/2001 | LeBlanc et al. |
| 6,816,727 B2 | 11/2004 | Cox et al. |
| 6,819,916 B1 | 11/2004 | Griffith et al. |
| 2003/0092455 A1 | 5/2003 | Natsuno |
| 2003/0222819 A1 | 12/2003 | Karr et al. |
| 2003/0233278 A1 | 12/2003 | Marshall |

FOREIGN PATENT DOCUMENTS

JP    H05-063696 A    3/1993

(Continued)

OTHER PUBLICATIONS

International Search Report issued against PCT/JP02/00950, 1 Page.

(Continued)

*Primary Examiner*—William D. Cumming
(74) *Attorney, Agent, or Firm*—Brinks Hofer Gilson & Lione

(57) ABSTRACT

A mediation center apparatus 1 receives registration as answerers from mobile phones 9 owned by answerers. The mediation center apparatus 1 provides, responding to requests from a mobile phone 10 owned by a questioner, candidate list information of suitable answerers among answerers who are registered in the mediation center apparatus 1, for the mobile phone 10. When the mediation center apparatus 1 receives, from the mobile phone 10, information which instruct a selection of answerers, the mediation center apparatus 1 establishes a circuit connection between the mobile phones 9 owned by the selected answerer and the mobile phone 10 owned by the questioner. A mediation consultancy service is provided by the answerer to the questioner by use of the circuit connection.

10 Claims, 10 Drawing Sheets

FOREIGN PATENT DOCUMENTS

| | | |
|---|---|---|
| JP | H11-194985 A | 7/1999 |
| JP | 2000-511672 | 9/2000 |
| JP | 2002-049786 A | 2/2002 |
| KR | 2000-063712 A | 11/2000 |
| WO | WO98/04061 A1 | 1/1998 |
| WO | WO 00/57326 A1 | 9/2000 |

OTHER PUBLICATIONS

Office Action issued against a counterpart Korean Application, 2 Pages.

Kaasinen, E. et al., "Two Approaches to Bringing Internet Services to WAP Devices", Computer Networks, *Elsevier Science B.V.*, vol. 33, Jun. 2000, pp. 231-246.

Colafigli, C. et al., "InfoParco: An Experience in Designing an Information System Accessible through WEB and WAP Interfaces", System Sciences, *Proceedings of the 34th Annual Hawaii International Conference*, Jan. 2001, 6 Pages.

Metter, M. et al., "WAP Enabling Existing HTML Applications", *User Interface Conference*, Jan. 2000, pp. 49-57.

Chinese Office Action dated Mar. 10, 2006.

Japanese Office Action mailed Jul. 25, 2006.

"Net Business: Learned from USA, the Fifth Story, ExpertCentral.com," Nikkei NetBusiness, pp. 188-192, May 15, 2000.

Canadian Office Action mailed Aug. 8, 2006.

Norwegian Office Action dated Oct. 20, 2006.

EPO Office Action dated Jan. 15, 2007.

Japanese Office Action mailed Apr. 25, 2006.

Hagleitner, M. et al., "WAP-G: A Case Study in Mobile Entertainment", System Sciences, *Proceedings of the 35th Annual Hawaii International Conference*, 2002, 10 pages.

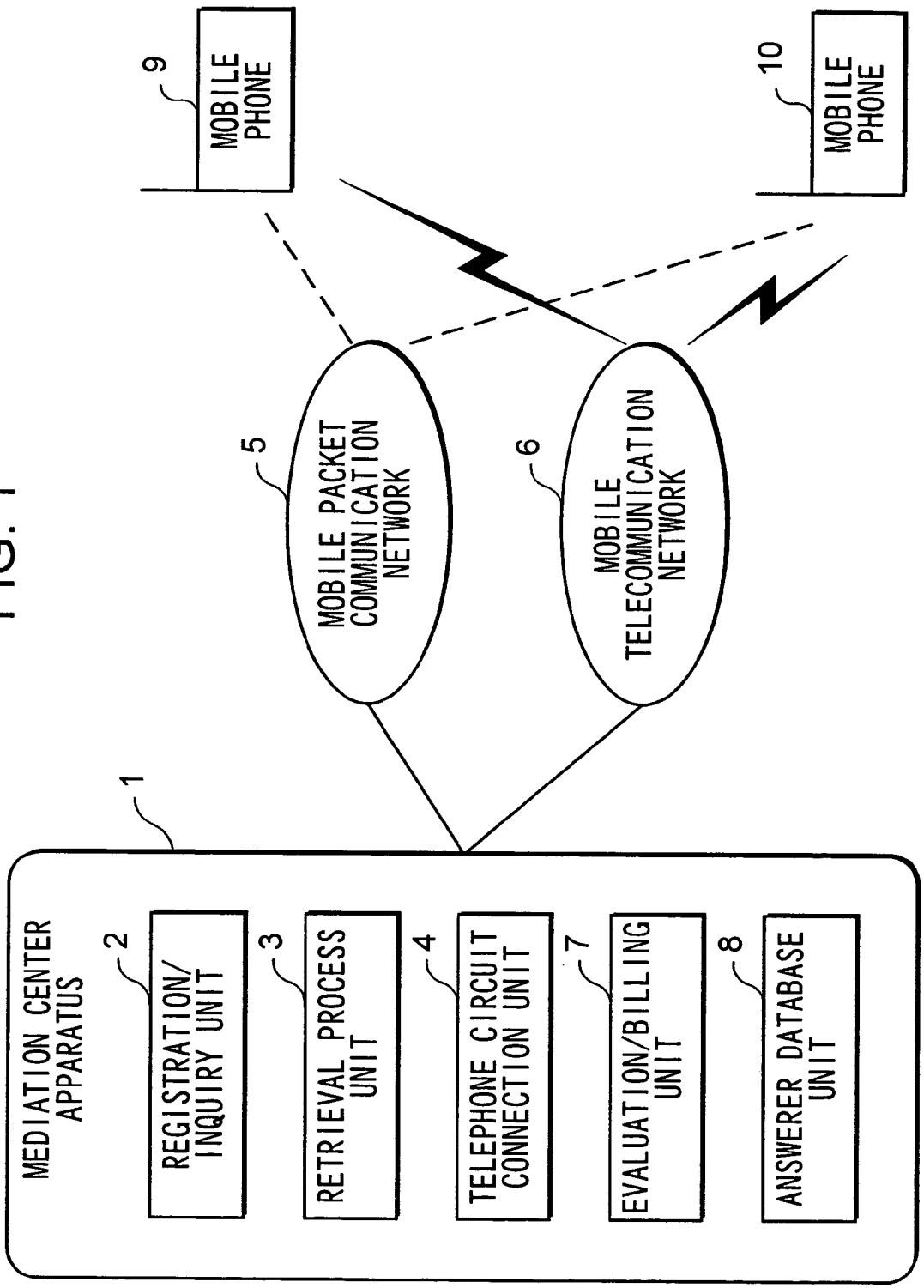

FIG. 2

| TELEPHONE NUMBER UID | ANSWERER NAME KM | PASSWORD CRI | REPLY POSSIBILITY FLAG ACT | ANSWER FIELD MAJ | EVALU-ATION RANK RK | REPLY RATE RES | CONSUL-TATION FEE PRI | REAL CONSULTATION CASE NUMBER SUM |
|---|---|---|---|---|---|---|---|---|
| 09012345678 | Mr. A | 0123 | 1 | ENTERTAINMENT / SKIING | 9.8 | 87.5 | 98 | 121 |
| 09034215678 | Ms. C | 0341 | 1 | ENTERTAINMENT / MAHJONG | 6.5 | 98.1 | 65 | 88 |
| 09012995678 | Mr. P | 9696 | 1 | ENTERTAINMENT / BIVOUAC | 7.5 | 87.5 | 75 | 121 |
| 09099345678 | Mr. T | 3923 | 0 | ENTERTAINMENT / MOTORCYCLE | 9.8 | 87.5 | 98 | 105 |
| 09012345679 | Mr. D | 5569 | 0 | LITERATURE / JAPAN | 9.8 | 87.5 | 98 | 109 |
| ... | ... | ... | ... | ... | ... | ... | ... | ... |
| 09012345678 | Ms. W | 1934 | 1 | ENTERTAINMENT / SKIING | 9.8 | 87.5 | 98 | 64 |
| 09012345678 | Ms. K | 3141 | 1 | ENTERTAINMENT / SKIING | 7.7 | 87.5 | 77 | 3 |
| 09012345678 | Mr. N | 4848 | 1 | ENTERTAINMENT / SKIING | 2.8 | 34.2 | 28 | 45 |
| 09012345678 | Ms. U | 2828 | 1 | SCIENCE / COSMOS | 4.7 | 87.5 | 47 | 83 |
| 09012347878 | Mr. L | 5963 | 1 | SCIENCE / BIOCHEMISTRY | 7.8 | 66.0 | 78 | 195 |

TELEPHONE NUMBER
REGISTRATION NAME
PASSWORD (4 DIGIT NUMBER)
PLEASE FILL IN THE BLANKS ABOVE AND COMPLETE YOUR ANSWERER REGISTRATION.
REGISTRATION

T2

<NEW REGISTRATION>

PLEASE SELECT THE APPROPRIATE FIELD FOR YOUR ANSWERING SERVICE.

1. LITERATURE
2. MATHEMATICS
3. SCIENCE
4. POLITICS
5. FOREIGN COUNTRIES
6. HOBBY
7. GENERAL KNOWLEDGE
8. LIVING
9. PREVIOUS PAGE
0. NEXT PAGE

T1

<ANSWERER MENU>

PLEASE SELECT YOUR DESIRED OPERATION.

1. NEW REGISTRATION
2. REGISTERED INFORMATION
3. ALTERATION OF INFORMATION
4. DELETION OF REGISTRATION
5. ALTERATION OF STATUS

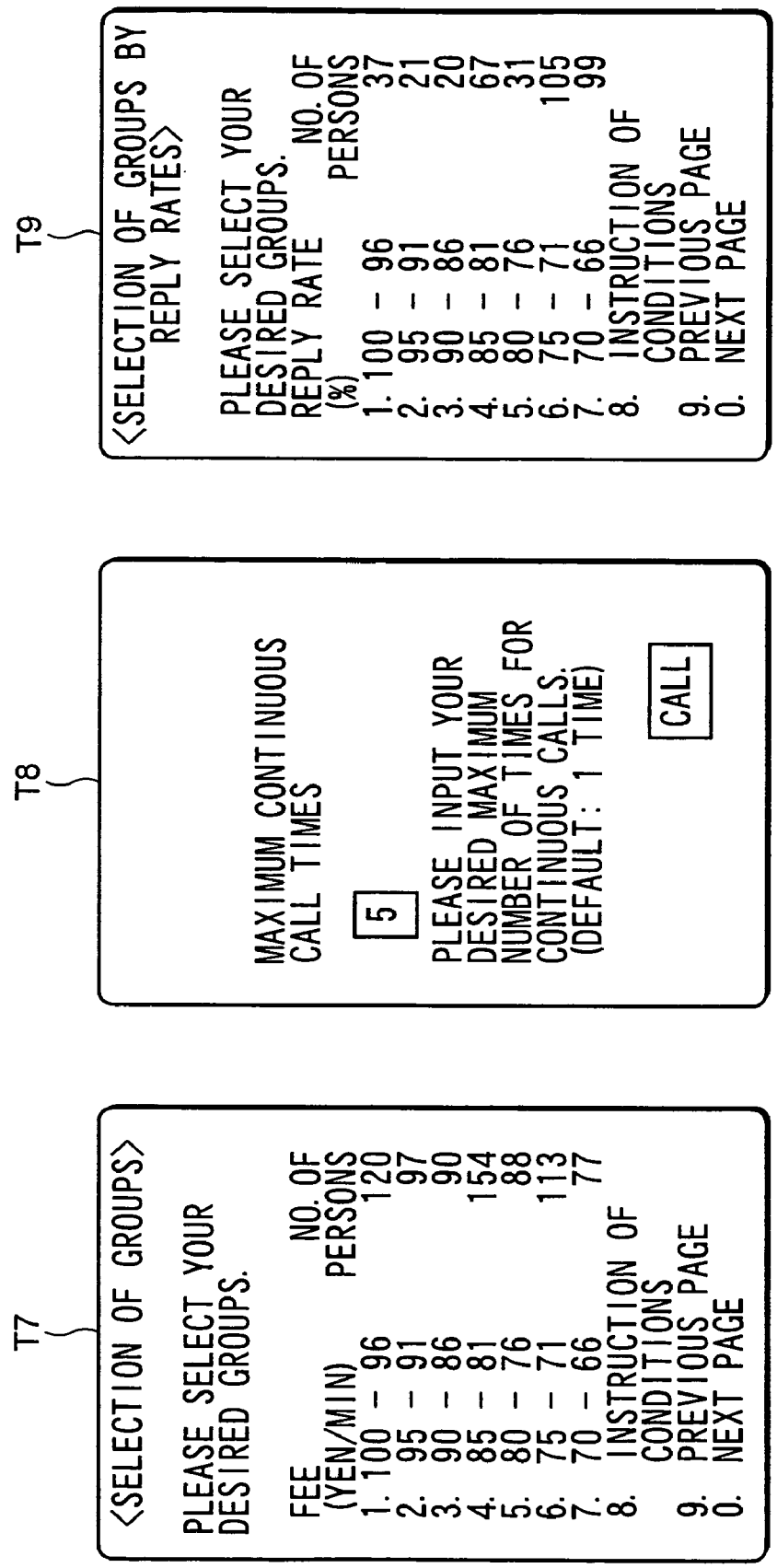

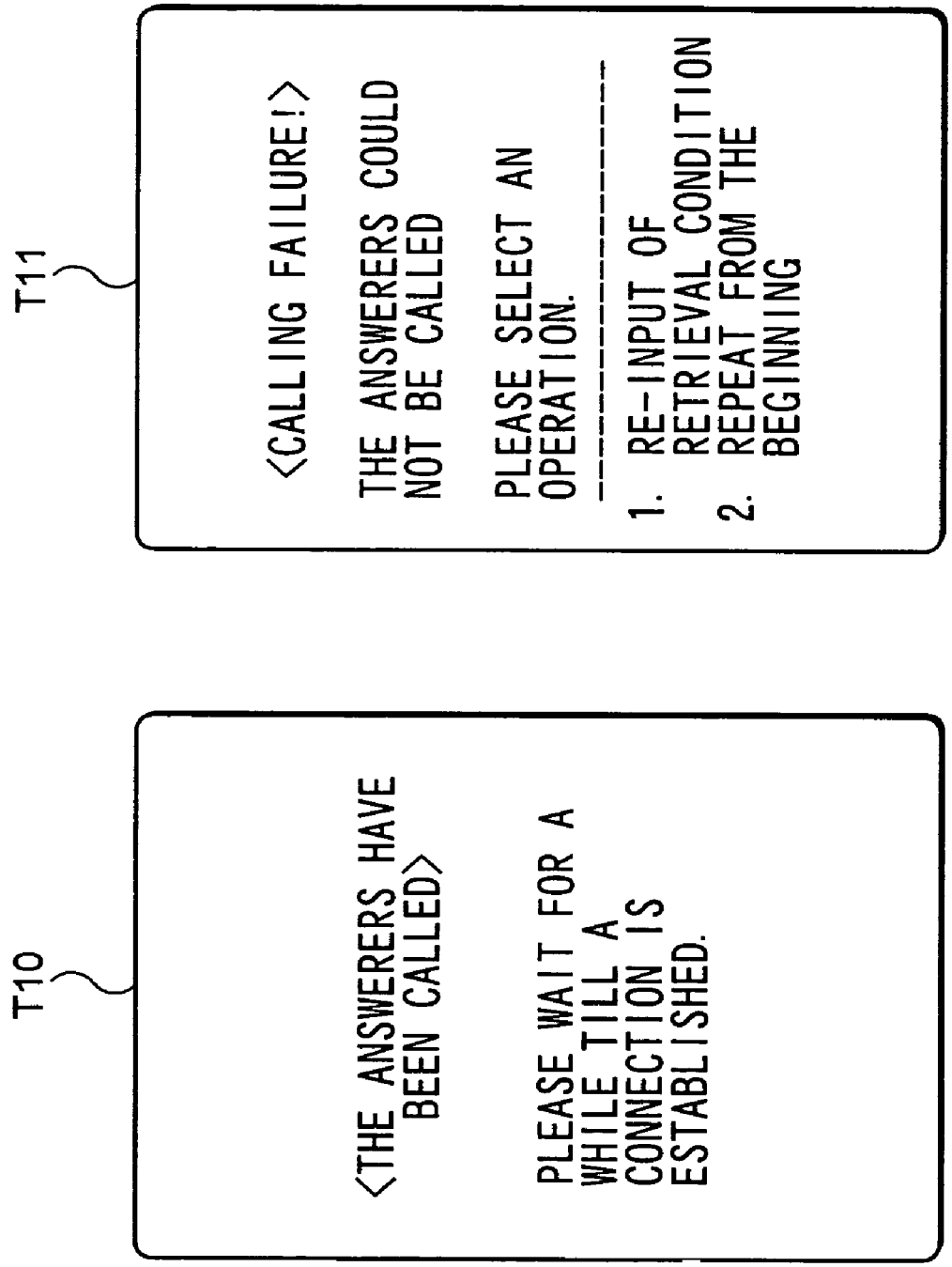

APPARATUS AND METHOD FOR MEDIATING BETWEEN CALLERS AND RECEIVERS USING MOBILE PHONES

This application is a continuation of application Ser. No. 10/258,985 filed on Oct. 30, 2002 now U.S. Pat. No. 7,069,028, the entire content of which is incorporated herein by reference.

BACKGROUND

1. Technical Field

The present invention relates to an apparatus and method for mediating between questioners and answerers in a consultancy service using mobile phones.

2. Description of Related Art

In the conventional art, printed matter, in the form of, for example, information exchange magazines, is used to mediate between questioners, who are persons who have questions, and answerers, who are persons who can provide answers to questions. In a case where, for example, an information exchange magazine is used as a medium by questioners and answerers, answerers provide to publishers of information exchange magazines information on a knowledge area (field) about which they can act as answerers, such as a sport(s), skiing, golf, and so on; city area information, such as Daikanyama, Ginza, and so on. They also provide with their knowledge area (field) information, contact information to be used by questioners to reach answerers, and which may be in the form of addresses, facsimile numbers, telephone numbers, names, and so on. All of this information is published by the publishers to which it is provided in information exchange magazines. Questioners who buy the information exchange magazines, select answerers who offer information under fields relevant to their questions by referring to information provided in the magazines; and contact selected answerers by mail, facsimile, telephone, and so on. In this way, questioners and the answerers are able to communicate with one another.

However, communication mediated through printed matter is subject to a number of problems. Firstly, the process of purchase of printed matter followed by manual selection of answerers referring to information in printed matter is both time-consuming and complicated. Further, in the case that, for example, a questioner has an urgent question, for example, in a case that s/he wishes to know a location of a nearby restaurant when already outside, it may not be physically possible for the questioner to purchase suitable printed matter; or, having purchased printed matter, a questioner may not be able to find any relevant information on answerers in time.

Further, due to the nature of printed matter, after answerers provide their information, namely, information on a field about which they can provide answers, along with information for reaching them, to a publisher of printed matter, it may take a relatively long period of time for the printed matter to be published. Moreover, there is a risk that personal information such as addresses, which answerers must make public in printed matter as contact information for questioners, may be misused. Consequently, persons may be dissuaded from publishing contact information in information exchange magazines, even though they may have the knowledge and experience to provide a service as an answerer.

BRIEF SUMMARY OF THE INVENTION

The present invention is aimed to provide, as a means to overcome problems explained above, a mediation method for consultation and a mediation apparatus for the method, which enable questioners to easily raise questions at any time and in any location, which also enable answerers to quickly register themselves as answerers without complicated registration work, and which protect the privacy of questioners and answerers.

To overcome the stated problems, in accordance with an aspect of the present invention, a mediation apparatus may comprise: a registration request receiving unit, which receives, from mobile phones of answerer candidates, registration requests which contain telephone number data and answer field data of the answerer candidates, via a mobile telecommunication network; a storing unit, which stores candidate data which contain at least the telephone number data and the answer field data; a mediation request receiving unit, which receives, from a mobile phone of a questioner, a mediation request which contains telephone number data and question field data of the questioner, via the mobile telecommunication network; an acquiring unit, which selects, from the candidate data stored by the storing unit, candidate data which contain answer field data corresponding to the question field data, and acquires, from the selected candidate data, telephone number data of mobile phones of answerers; and a connection establishing unit, which establishes communication circuit connections in the mobile telecommunication network between mobile phones of the answerers and a mobile phone of the questioner, on the basis of the telephone number data acquired by the acquiring unit and the telephone number data contained in the mediation request. This is referred to as the first embodiment in the present invention.

Preferably, in the configuration of the first embodiment, the acquiring unit may comprise: an extracting unit, which extracts, from the candidate data stored by the storing unit, one or more items of candidate data which contain answer field data corresponding to the question field data; a candidate data providing unit, which provides the candidate data extracted by the extracting unit for a mobile phone of the questioner, via the mobile telecommunication network; an appointment data receiving unit, which receives, from the mobile phone of the questioner, appointment data which appoint one or more desired candidates from among candidates who are shown in the candidate data, via the mobile telecommunication network; and a telephone number acquiring unit, which acquires, from the candidate data stored by the storing unit, telephone number data of mobile phones of the answerers, on the basis of the appointment data. This is referred to as the second embodiment in the present invention.

Preferably, in the configuration of the first embodiment, the acquisition unit may comprise: an extracting unit, which extracts, from the candidate data stored by the storing unit, two or more items of candidate data which contain answer field data corresponding to the question field data; a condition data receiving unit, which receives, from the mobile phone of the questioner, condition data relating to conditions for dividing said two or more items of candidate data extracted by the extracting unit into groups, via the mobile telecommunication network; a guide data sending unit, which divides said two or more items of candidate data into groups on the basis of the condition data, and sends guide data which display each of the groups at the mobile phone of the questioner; an appointment data receiving unit, which receives, from the mobile phone of the questioner, appointment data which indicate desired groups from among one or more groups shown in the guide data, via the mobile telecommunication network; and, a telephone number acquiring unit, which acquires, from the candidate data stored by the storing unit, telephone number data of mobile phones of the answerers, on the basis of the appointment data. This is referred to as the third embodiment in the present invention.

Preferably, in the configuration of first embodiment, the connection establishing unit may comprise: a first connecting unit, which sends calls to mobile phones of the answerers on the basis of the telephone number data acquired by the acquiring unit, and establishes communication circuit connections in the mobile telecommunication network with mobile phones of the answerers; a second connecting unit, which sends a call to a mobile phone of the questioner on the basis of the telephone number data contained in the mediation request, and establishes a communication circuit connection in the mobile telecommunication network with the mobile phone of the questioner; and a third connecting unit, which interconnects the communication circuit connections established by the first connecting unit and the communication circuit connection established by the second connecting unit. This is referred to as the fourth embodiment in the present invention.

Preferably, in the configuration of the fourth embodiment, the first connecting unit may comprise: a re-connecting unit, which, in a case that two or more items of telephone number data are acquired by the acquiring unit, and that a communication circuit connection established on the basis of one item of the telephone number data acquired by the acquiring unit fails, sends a call to a mobile phone on the basis of another item of the telephone number data acquired by the acquiring unit, and establishes a communication circuit connection in the mobile telecommunication network with the mobile phone. This is referred to as the fifth embodiment in the present invention.

Preferably, in the configuration of the first embodiment, a part or the whole of the mobile telecommunication network is a packet data communication network. This is referred to as the sixth embodiment in the present invention.

Moreover, in accordance with an aspect of the present invention, a mediation method may comprise: a registration request receiving step, in which registration requests, which contain telephone number data and answer field data of the answerer candidates, are received from mobile phones of answerer candidates via a mobile telecommunication network; a storing step, in which candidate data, which contain at least the telephone number data and the answer field data, are stored; a mediation request receiving step, in which a mediation request, which contains telephone number data and question field data of a questioner, are received from a mobile phone of the questioner via the mobile telecommunication network; an acquiring step, in which candidate data, which contain answer field data corresponding to the question field data, are selected from the candidate data stored in the storing step, and telephone number data of mobile phones of answerers are acquired from the selected candidate data; and a connection establishing step, in which communication circuit connections in the mobile telecommunication network between mobile phones of the answerers and the mobile phone of the questioner are established on the basis of the telephone number data acquired in the acquiring step and the telephone number data contained in the mediation request. This is referred to as the seventh embodiment in the present invention.

Preferably, in the configuration of the seventh embodiment, the acquisition step may comprise: an extracting step, in which one or more items of candidate data, which contain answer field data corresponding to the question field data, are extracted from the candidate data stored in the storing step; a candidate data providing step, in which the candidate data extracted in the extracting step are provided for the mobile phone of the questioner via the mobile telecommunication network; an appointment data receiving step, in which appointment data, which appoint one or more desired candidates from among candidates who are shown in the candidate data, are received from the mobile phone of the questioner via the mobile telecommunication network; and a telephone number acquiring step, in which telephone number data of mobile phones of the answerers are acquired from the candidate data stored in the storing step on the basis of the appointment data. This is referred to as the eighth embodiment in the present invention.

Preferably, in the configuration of the seventh embodiment, the acquisition step may comprise: an extracting step, which extracts, from the candidate data stored in the storing step, two or more items of candidate data which contain answer field data corresponding to the question field data; a condition data receiving step, which receives, from the mobile phone of the questioner, condition data relating to conditions for dividing said two or more items of candidate data extracted in the extracting step into groups, via the mobile telecommunication network; a guide data sending step, which divides said two or more items of candidate data into groups on the basis of the condition data, and sends guide data which shows each of the groups to the mobile phone of the questioner; an appointment data receiving step, which receives, from the mobile phone of the questioner, appointment data which appoint desired groups from among one or more groups shown in the guide data, via the mobile telecommunication network; and a telephone number acquiring step, which acquires, from the candidate data stored in the storing step, telephone number data of mobile phones of the answerers, on the basis of the appointment data. This is referred to as the ninth embodiment in the present invention.

Preferably, in the configuration of the seventh embodiment, the connection establishing step may comprise: a first connecting step, in which calls are sent to mobile phones of the answerers on the basis of the telephone number data acquired in the acquiring step, and communication circuit connections are established in the mobile telecommunication network with mobile phones of the answerers; a second connecting step, in which a call is sent to the mobile phone of the questioner on the basis of the telephone number data contained in the mediation request, and communication circuit connections are established in the mobile telecommunication network with the mobile phone of the questioner; and a third connecting step, in which the communication circuit connections established in the first connecting step and the communication circuit connection established in the second connecting step are interconnected. This is referred to as the tenth embodiment in the present invention.

Preferably, in the configuration of the tenth embodiment, the first connecting step may comprise: a re-connecting step, in which, in a case that two or more data items relating to telephone numbers are acquired in the acquiring step, and that a communication circuit connection on the basis of one item of the telephone number data acquired in the acquiring step fails, a call is sent to a mobile phone on the basis of another item of the telephone number data acquired in the acquiring step, and a communication circuit connection is established in the mobile telecommunication network with the mobile phone. This is referred to as the eleventh embodiment in the present invention.

Preferably, in the configuration of the seventh embodiment, a part or whole of the mobile telecommunication network is a packet data communication network. This is referred to as the twelfth embodiment in the present invention.

BRIEF DESCRIPTION OF THE DRAWINGS

FIG. 1 is a drawing illustrating general configurations of a telecommunication network and a mediation center apparatus of one embodiment of the present invention.

FIG. 2 is a drawing illustrating a configuration of a database and examples of data stored in the database in one embodiment of the present invention.

FIG. 4 is a drawing illustrating examples of screens shown in an answerer's mobile phone during a registration, alteration, deletion or inquiry step according to one embodiment of the present invention.

FIGS. 6A, 6B, and 6C are drawings illustrating examples of screens shown in a questioner's mobile phone during a question mediation step in one embodiment of the present invention.

DETAILED DESCRIPTION OF THE PREFERRED EMBODIMENTS

Figure 3:
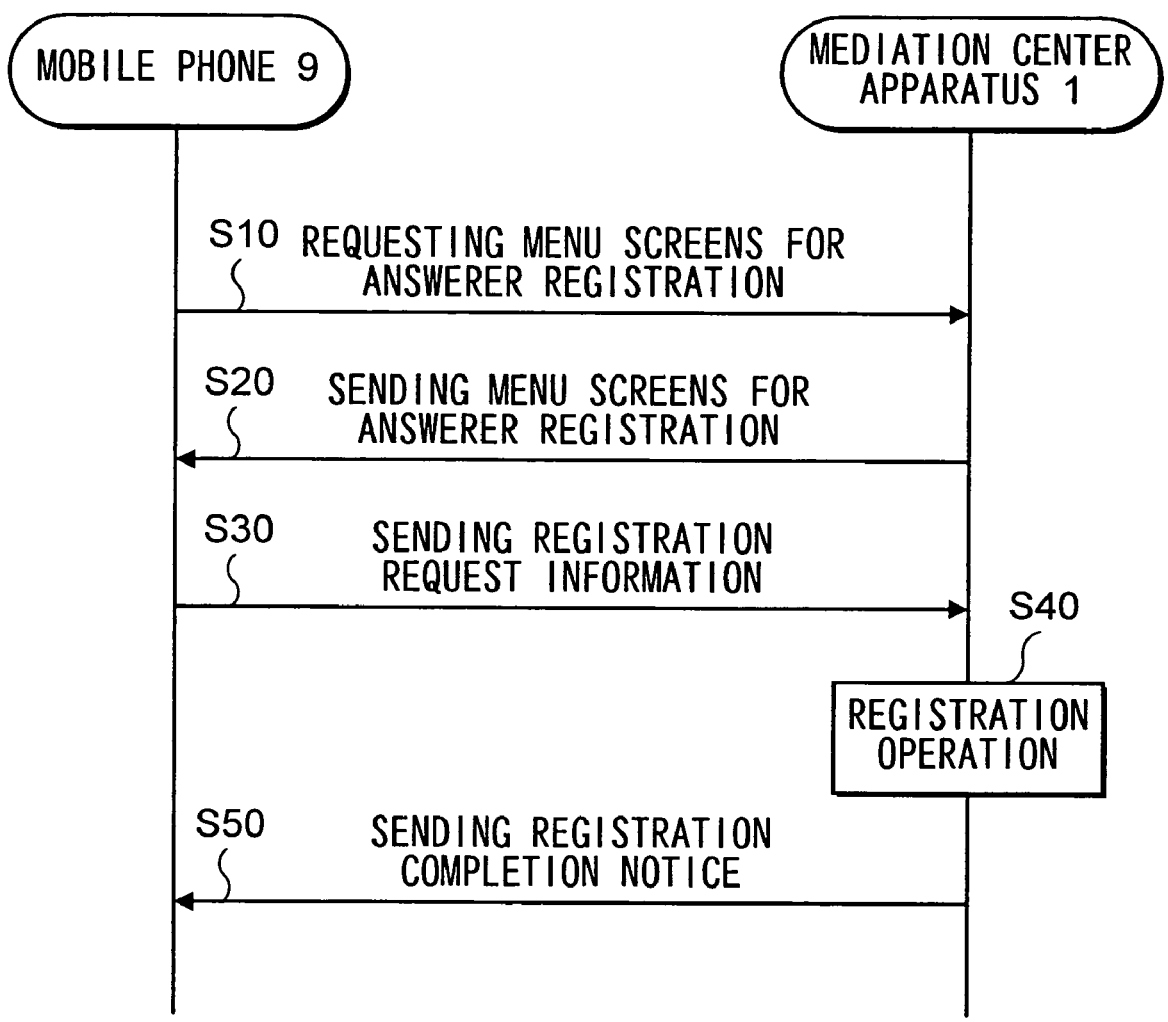
FIG. 3 is a sequence chart illustrating operations of an answerer's mobile phone and a mediation center apparatus during an answerer's information registration step in one embodiment of the present invention.

An embodiment of the present invention will be explained below with reference to figures. The following embodiment is a mere example and should not be interpreted as limiting the scope of invention; the present invention is open to a variety of modifications available within the technical scope of the concept of the invention.

A. The Configuration of the Whole System

FIG. 1 shows a general configuration of a system for providing a mediation consultancy service by invoking the mediation method of the present invention (hereafter, the system will be referred to as "Mediation Consultancy System"). Mediation Consultancy System contains a mediation center apparatus 1, a mobile packet communication network 5, a mobile telecommunication network 6, a mobile phone 9, and a mobile phone 10.

The mobile phone 9 and the mobile phone 10 are able to connect to the mobile packet communication network 5, and to receive packet communication services provided by the mobile packet communication network 5. The mobile phone 9 and the mobile phone 10 are also able to connect to the mobile telecommunication network 6, and to receive mobile telecommunication services provided by the mobile telecommunication network 6. For simplicity of explanation, only the mobile phone 9 and the mobile phone 10 are shown in the figure, although many mobile phones are able to connect to the mobile packet communication network 5 and the mobile telecommunication network 6.

The mobile phone 9 and the mobile phone 10 are provided with: a wireless communication unit for communicating with base stations (not shown) of the mobile packet communication network 5 and the mobile telecommunication network 6; an audio input-output unit for voice communications; a display unit, which is provided with a liquid crystal display and so on, for displaying texts and pictures in its display; a manipulation unit, which is provided with a ten key pad and so on, for a user to provide the mobile phone his/her instructions; and a microcomputer for controlling the other components of the mobile phone 9 and the mobile phone 10. The microcomputer has a memory which stores a browser program for sending and receiving text data, picture data, audio data, etc. and for displaying these data in the display unit. The microcomputer follows instructions of the browser program and receives information such as screen data of Home Pages etc. from a contents server (not shown) connected to the mobile packet communication network 5, via the mobile packet communication network 5, in a CHTML (Compact Hyper Text Markup Language) format, and displays the received information on its display unit. The microcomputer also follows instructions of the browser program and sends information corresponding to a user's instructions to the contents server, via the mobile packet communication network 5.

In the mediation consultancy service in the present invention, consultancy services on all matters, which are provided to questioners by answerers using mobile phones 9 and mobile phones 10, are mediated. Hereafter, for the sake of description, mobile phones 9 will be supposed to be owned by answerers and mobile phones 10 will be supposed to be owned by questioners.

B. The Mediation Center Apparatus

A configuration of a mediation center apparatus 1 will be explained below by referring to FIG. 1. The mediation center apparatus 1 is provided with a registration/inquiry unit 2, a retrieval process unit 3, a telephone circuit connection unit 4, an evaluation/billing unit 7, and an answerer database unit 8, in addition to a communication unit (not shown) for communicating with the mobile packet communication network 5 and the mobile telecommunication network 6, and a display unit (not shown) and a manipulation unit (not shown) which are used by administrators to manage the mediation center apparatus 1. The mediation center apparatus 1 is also provided with a microcomputer (not shown), and the microcomputer has a memory for storing programs which provide the microcomputer with instructions for all control operations. The memory of the microcomputer is also used to temporarily store data of other components of the mediation center apparatus 1.

The registration/inquiry unit 2, after it receives an answerer registration request from a mobile phone 9 owned by an answerer via the mobile packet communication network 5, enables the display unit of the mobile phone 9 to display dialogue screens for answerer registration by sending necessary data in CHTML format to the mobile phone 9 via the mobile packet communication network 5, and requests an owner of the mobile phone 9 to input data required for answerer registration. Also, the registration/inquiry unit 2, after it receives data required for answerer registration from the mobile phone 9 via the mobile packet communication network 5, writes the received data in a new record of the answerer database unit 8 (hereafter, this operation will be referred to as "registration"), and enables the display unit of the mobile phone 9 to display a screen to notify completion of registration by sending necessary data in CHTML format to the mobile phone 9 via the mobile packet communication network 5.

In addition to the process described above relating to answerer registration, the registration/inquiry unit 2 can alter and delete contents already registered in the answerer database unit 8; and it can send contents already registered in the answerer database unit 8 to a mobile phone 9 for the answerer's inquiry. When the registration/inquiry unit 2 carries out these processes for amendment, deletion, and inquiry of registered contents, it also enables the mobile phone 9 to display dialogue screens by sending necessary data in CHTML format to the mobile phone 9, and performs interactive communications with an owner of the mobile phone 9.

In the Mediation Consultancy System of the present invention, an owner of a mobile phone 9 can notify the mediation center apparatus I whether the owner is ready to receive questions. Consequently, a questioner is prevented from calling an answerer when it is not convenient for the answerer. When the registration/inquiry unit 2 receives information which shows whether an answerer is ready to receive questions, it writes the information in a record, corresponding to the mobile phone 9, of the answerer database unit 8. In such a case, the registration/inquiry unit 2 also enables the mobile phone 9 to display a dialogue screen which contains software buttons corresponding to "possible to receive questions" and "not possible to receive questions" by sending necessary data in CHTML format to the mobile phone 9. Consequently, the owner of the mobile phone 9 can send to the registration/inquiry unit 2 information which shows whether s/he is ready to receive questions. Regarding this process, instead of using software buttons mentioned above, certain keys in the manipulation unit of the mobile phone 9 can be assigned to send information indicating whether an answerer is ready to receive questions.

The retrieval process unit 3, after it receives a request for a service for a questioner in Mediation Consultancy System in the present invention, from a mobile phone 10, which is owned by a questioner, via the mobile packet communication network 5, extracts, from the answerer database unit 8, information relating to answerers or answerer groups who can match the request, and provides the mobile phone 10 with a result of the extraction. More concretely, after the retrieval process unit 3 receives a request for a service from the mobile phone 10, it requests the owner of the mobile phone 10 to input extraction condition information which is required for extracting information relating to answerers, by sending necessary data in CHTML format to the mobile phone 10 via the mobile packet communication network 5. The extraction condition information concerns, for example, field of question, charge rate, reply rate, and so on. When the retrieval process unit 3 receives extraction condition information from the mobile phone 10, it extracts, from the answerer database unit 8, answerers or answerer groups who can match the extraction condition information, and enables the display unit of the mobile phone 10 to display information on the extracted answerers or answerer groups, such as nicknames, charge rates, and reply their rates, by sending necessary data in CHTML format to the mobile phone 10. At the same time, the retrieval process unit 3 requests the owner of the mobile phone 10 to select one or more answerers from the extracted answerers or answerer groups and to send a result of the selection to the retrieval process unit 3. When the retrieval process unit 3 receives, from the mobile phone 10, the information showing one or more answerers whom the owner of the mobile phone 10 selected, it retrieves information of the one or more answerers from the answerer database unit 8, obtains telephone number information from the retrieved information, and sends the telephone number information to the telephone circuit connection unit 4.

The telephone circuit connection unit 4 calls a mobile phone 9, which is owned by one of the answerers retrieved by the retrieval process unit 3, and a mobile phone 10, which is owned by the questioner, via base stations, and if both of the mobile phone 9 and the mobile phone 10 reply to the call, the telephone circuit connection unit 4 establishes a circuit connection for voice communication between the mobile phone 9 and the mobile phone 10. By means of this telephone circuit connection, the owner of the mobile phone 9 and the owner of the mobile phone 10 are enabled have a conversation to exchange questions and answers. Details of this circuit connection process will be explained later.

The evaluation/billing unit 7 calculates bills for questioners and rewards for answerers for voice communications between mobile phones 9 and mobile phones 10 which are established by the telephone circuit connection unit 4. While a connection of voice communication circuit between a mobile phone 9 and a mobile phone 10 is established, the evaluation/billing unit 7 logs connection time of the voice communication circuit between the mobile phone 9 and the mobile phone 10. When a voice communication between an answerer and a questioner is terminated and a connection of voice communication circuit between the mobile phone 9 and the mobile phone 10 is released, the evaluation/billing unit 7 retrieves, from the answerer database unit 8, a record corresponding to the owner of the mobile phone 9, and from the retrieved record, it obtains information required for calculating a bill. Then the evaluation/billing unit 7 calculates a reward for the answerer, namely the owner of the mobile phone 9, and a bill for the questioner, namely the owner of the mobile phone 10, on the basis of the information which the evaluation/billing unit 7 obtained from the record and from a connection time which the evaluation/billing unit 7 logged. A method for performing these calculations will be described later.

Further, after a connection of a voice communication circuit between the mobile phone 9 and the mobile phone 10 is terminated, the evaluation/billing unit 7 sends a voice guidance message to the mobile phone 10, requesting the questioner to input an evaluation on the answerer. One example of such a voice guidance message is "Now, you are requested to evaluate the contents of the answers which you have just received from the answerer on a scale of from 0 and 9. Please push one of the ten keys between 0 and 9 according to your evaluation, after you hear a beep. A larger number means a higher evaluation. If you skip inputting your evaluation, 5 will be registered as your evaluation. . . . (beeping sound)". When the evaluation/billing unit 7 receives evaluation information responding to the voice guidance from the mobile phone 10 via the mobile telecommunication network 6, it retrieves a record corresponding to the mobile phone 9 owned by the answerer from the answerer database unit 8, and updates information related to evaluation of the answerer in the retrieved record, on the basis of the evaluation information.

The answerer database unit 8 stores various information related to answerers in relation to telephone numbers of mobile phones which are owned by answerers. FIG. 2 shows a configuration of the answerer database unit 8 and examples of information stored in the answerer database unit 8. The answerer database unit 8 consists of many records, and each record contains information relating to one registered answerer. Each record includes the following fields: Telephone Number UID, Answerer Name KM, Password CRI, Reply Possibility Flag ACT, Answer Field MAJ, Evaluation Rank RK, Reply Rate RES, Consultation Fee PRI, and Real Consultation Case Number SUM. Explanation of data contained in each field of the answerer database unit 8 is given below.

Telephone Number UID contains telephone number information of mobile phones 9 which are owned by answerers. Values in this field are written by the registration/inquiry unit 2 when owners of mobile phones 9 seek registration as answerers.

Answerer Name KM contains name information of owners of mobile phones 9. Values in this field are written by the registration/inquiry unit 2 when owners of mobile phones 9 request registrations as answerers or amendment of registered information. Values in this field are used to provide information which is displayed in a display unit of a mobile phone 10 when the retrieval process unit 3 sends information of extracted answerers to a mobile phone 10 owned by a questioner. Values in this field are decided freely by each owner of mobile phone 9, and each answerer can register either his/her real name or his/her nickname.

Password CRI contains password information of owners of mobile phones 9. Values in this field are written by the registration/inquiry unit 2 when owners of mobile phones 9 request registration as answerers, or amendment of registered information. When the registration/inquiry unit 2 receives a request for amendment, deletion, or inquiry of registered information, which are explained above, password information is used to authenticate that a sender of the request is an actual owner of a mobile phone 9. For example, if the registration/inquiry unit 2 receives a request for amendment of registered information from a mobile phone whose registered telephone number is "09012345678", first, it causes the display unit of the mobile phone 9 to display a dialogue screen to request a password input. Next, when the registration/inquiry unit 2 receives information input as a password from the mobile phone 9, it retrieves a record whose Telephone Number UID value is "09012345678" from the answerer database unit 8, and obtains a Password CRI value of the retrieved record. According to the example shown in FIG. 2, it obtains "0123" as the value. Next, the registration/inquiry unit 2 determines whether the received password information and "0123" match, and if they match, the registration/inquiry unit 2 determines that the authentication is successful. In FIG. 2, 4-digit numbers are used for passwords, but passwords can be numerical digits, letters, symbols, or combinations thereof.

Reply Possibility Flag ACT contains information showing whether each owner of mobile phone 9 is ready to receive questions. Values in this field are written by the registration/inquiry unit 2 when an owner of a mobile phone 9 sends his/her condition information, namely whether it is possible to receive questions, and the registration/inquiry unit 2 receives this information. Reply Possibility Flag ACT can contain a value "0" or "1", and "0" means that for the owner of the mobile phone 9 it is currently unable to receive questions, and "1" means that for the owner of the mobile phone 9 it is now possible to receive questions. For example, according to FIG. 2, since Reply Possibility Flag ACT value of the record whose Telephone Number UID value is "09012345678" is "1", the owner of this mobile phone is now ready to receive questions.

Answer Field MAJ contains information of fields where owners of mobile phones 9 can answer as answerers. Values in this field are written by the registration/inquiry unit 2 when owners of mobile phones 9 seek registration as answerers or amendments of registered information. Field information included in this field is used as an extraction condition when the retrieval process unit 3 extracts information of answerers.

Evaluation Rank RK contains mean values of evaluations which were made by questioners when owners of mobile phones 9 previously provided their services as answerers. As explained above, in the mediation consultancy service in this embodiment, when a voice communication between an answerer and a questioner is terminated, the evaluation/billing unit 7 receives, from the questioner, evaluation information of the answerer. In this embodiment, the evaluation/billing unit 7 receives integers between 0 and 9 as evaluation information from questioners, and it converts the integers into evaluation values in a range of from 1 to 10. Then the evaluation/billing unit 7 retrieves a record corresponding to the mobile phone 9 of the answerer, reads out Evaluation Rank RK value and Real Consultation Case Number SUM value of the retrieved record, calculates a new mean evaluation value using the values read out and the evaluation value newly received, and updates the value of this field with the newly calculated mean evaluation value. More concretely, the following calculation is performed:

$$\{(\text{Evaluation Rank } RK \text{ value})*(\text{Real Consultation Case Number SUM value})+(\text{new evaluation value})\}/\{(\text{Real Consultation Case Number SUM value})+1\}$$

This calculation of mean value is for a mean value of all evaluation values obtained in the past, but this value can be a mean of evaluation values obtained in a certain period of time in the past, etc.

Reply Rate RES contains information showing at what percentage each mobile phone 9 replied to connection calls made by the telephone circuit connection unit 4 responding to connection requests from mobile phones 10 owned by questioners. If the telephone circuit connection unit 4 tries to connect a voice communication circuit with a mobile phone 9 owned by an answerer and fails, it retrieves a record corresponding to the mobile phone 9, reads out Reply Rate RES value and Real Consultation Case Number SUM value of the retrieved record, calculates a new reply rate using the following formula, and updates Reply Rate RES value with the newly calculated value:

$$(\text{Real Consultation Case Number SUM value})/\{(\text{Real Consultation Case Number Sum value})/(\text{Reply Rate RES value})*100+1\}*100$$

On the other hand, if the telephone circuit connection unit 4 tries to connect a voice communication circuit with a mobile phone 9 owned by an answerer and succeeds, it retrieves a record corresponding to the mobile phone 9, reads out Reply Rate RES value and Real Consultation Case Number SUM value of the retrieved record, calculates a new reply rate using the following formula, and updates Reply Rate RES value with the newly calculated value:

$$\{(\text{Real Consultation Case Number SUM value})+1\}/\{(\text{Real Consultation Case Number SUM value})/(\text{Reply Rate RES value})*100+1\}*100$$

To further explain the formulas above, (Real Consultation Case Number SUM value) shows a number of replies which the mobile phone 9 made in the past, and {(Real Consultation Case Number SUM value)/(Reply Rate RES value) *100} shows a number of connection trials which the telephone circuit connection unit 4 made to the mobile phone 9 in the past. This calculation is for a reply rate of the mobile phone 9 regarding all connection requests in the past, but this value can be a reply rate regarding connection requests in a certain period of time in the past, etc.

Consultation Fee PRI contains information showing a time unit fee of each owner of mobile phone 9, which owners of mobile phones 10 need to pay as a consultation fee, when the owner of mobile phone 9 answers questions made by owners of mobile phones 10. In this embodiment, values contained by Consultation Fee PRI show fees per minute in yen, and the values are calculated and updated by the evaluation/billing unit 7. It is preferable to adopt a calculation method which produces a larger value for this field, namely Consultation Fee PRI, when Evaluation Rank RK value of the same record is larger. Therefore, in this embodiment, the following formula is adopted:

(Consultation Fee *PRI* value)=(Evaluation Rank *RK* value)*10

However, a formula used by the evaluation/billing unit 7 for calculating a consultation fee is not limited to the formula above. For example, if it is considered that answerers whose reply rates for consultation requests are higher should be treated better, formulas which produce larger values for Consultation Fee PRI when corresponding Reply Rate RES values are larger, can be adopted. In such a case, answerers whose reply rates are high are rewarded accordingly, leading to an improvement in the overall service. Since Evaluation Rank RK values are in a range of between 1 and 10 in this embodiment, Consultation Fee PRI values are in a range of between 10 and 100. Consultation Fee PRI values are updated by the evaluation/billing unit 7 at the time that it updates Evaluation Rank RK values, since, in this embodiment, Consultation Fee PRI values are calculated using Evaluation Rank RK values.

When a consultation between an answerer and a questioner is finished and a connection of voice communication between a mobile phone 9 and a mobile phone 10 is terminated, the evaluation/billing unit 7 retrieves a record corresponding to the mobile phone 9 and calculates a fee for the mobile phone 10 by multiplying Consultation Fee PRI value of the retrieved record by the figure of connection time in minutes. Hereafter, the fee will be referred to as "consultation fee".

Further, the evaluation/billing unit 7 calculates rewards for services provided by answerers, which will be paid to owners of mobile phones 9. In this embodiment, the evaluation/billing unit 7 calculates rewards for answerers using the following formula:

(reward)=(consultation fee)*0.9

This means that 10 percent of a consultation fee, which is charged to questioners, is deducted as a commission for mediation by a provider of the mediation consultancy service, and 90 percent of the consultation fee is paid to answerers. The formula used for calculating rewards is not limited to the above formula. Further, conditions, if any, for paying rewards to answerers, such that, for example, only answerers whose total number of consultation cases is 100 or more can receive rewards, can be adopted. Also, the payment method of rewards to answerers is not limited to cash payment. For example, rewards can be given in a form of points, and answerers can exchange their points for goods. Rewards can also be paid by reducing charges for telephone calls made on mobile phones 9 owned by answerers.

Real Consultation Case Number SUM contains numbers showing how many times each owner of mobile phone 9 provided services as an answerer in the past. When a voice communication circuit between an answerer and a questioner is connected, the evaluation/billing unit 7 retrieves a record corresponding to the mobile phone 9, reads out Real Consultation Case Number SUM value, and updates Real Consultation Case Number SUM value with a value which is calculated by adding 1 to the original Real Consultation Case Number SUM value. In this embodiment, Real Consultation Case Number SUM value shows the number of times services were provided in the past, but this value can be a number of times services were provided in a certain period of time in the past, etc.

C. The Operation of Mediation Consultancy System

An explanation of operations of Mediation Consultancy System in this embodiment is given below.

C-1. The Registration of Answerer

First, an operation performed when an owner of a mobile phone 9 registers as an answerer with mediation center apparatus 1 using the mobile phone 9 will be explained with reference to FIGS. 3 and 4. FIG. 3 shows a flowchart of the operation sequence, and FIG. 4 shows screens displayed in the display unit of the mobile phone 9 in the answerer registration step.

The owner of the mobile phone 9 connects the mobile phone 9 to the mobile packet communication network 5 by manipulating the ten key pad, etc. in the manipulation unit, and requests the mediation center apparatus 1 for information for answerer registration via the mobile packet communication network 5 (Step S10). More concretely, s/he carries out such an operation by inputting Uniform Resource Locator (URL) for identifying an address in the communication network where there is data of screens for answerer registration in CHTML format, in the mobile phone 9, and sending it to the mobile packet communication network 5.

When the mediation center apparatus 1 receives the request for information for answerer registration from the mobile phone 9, it sends data for answerer registration in CHTML format to the mobile phone 9 via the mobile packet communication network 5 (Step S20). After the mobile phone 9 receives the information, it is displayed on its screen, which is shown as T1 in FIG. 4.

Screen T1 shows items such as "1. New Registration", "2. Registered Information". "3. Amendment of Information", "4. Deletion of Registration", and "5. Amendment of Status", and the owner of the mobile phone 9 can move to an operation step corresponding to each item by inputting a number of the item using the key pad of the manipulation unit. "1. New Registration" is to be selected when an owner of a mobile phone 9 newly registers himself/herself as an answerer. The others are to be selected by an owner of a mobile phone 9 who is already registered. "2. Registered Information" is to be selected when an owner of a mobile phone 9 requests present registered information for his/her confirmation. "3. Amendment of Information" is to be selected when an owner of a mobile phone 9 amends present registered information. "4. Deletion of Registration" is to be selected when an owner of a mobile phone 9 deletes present registered information. "5. Amendment of Status" is to be selected when an owner of a mobile phone 9 changes present condition information relating to whether an owner of a mobile phone 9 is ready to receive questions.

Here, as an example, an operation performed in a case that an owner of a mobile phone 9 selects "1. New Registration" will be explained. If key "1" is pressed by the owner of the mobile phone 9 while screen T1 is displayed, the mobile phone 9 sends its information to the mediation center apparatus 1 via the mobile packet communication network 5. When the mediation center apparatus 1 receives the information, it sends data of screens for a new registration menu in CHTML format to the mobile phone 9 via the mobile packet communication network 5. After the mobile phone 9 receives the information, it displays screen T2 shown in FIG. 4 as a screen showing a new registration menu in its display unit.

The screen T2 shows many categories of information, such as "1. Literature", "2. Mathematics", "3. Science", and so on. In this example, it also shows "9. Previous Page" and "0. Next Page", which are used to change pages, since the menu has many pages. The owner of the mobile phone 9 selects, from these fields, a field in which s/he can provide answers, and inputs a corresponding number using the key pad in the manipulation unit. When the number is inputted, the mobile phone 9 displays a screen showing more detailed fields within the selected field. The owner of the mobile phone 9 selects a field and inputs a corresponding number. This operation is repeated until the menu screen shows the owner of the mobile phone 9 selects the most detailed category within a field.

When the owner of the mobile phone 9 selects the most detailed category within a field as explained above, a screen T3 shown in FIG. 4 is displayed. The screen T3 shows "Telephone Number" item, "Registration Name" item, and "Password" item" for inputting a telephone number of the mobile phone 9, a name which the owner of the mobile phone 9 wants to register, and a password, respectively. The screen T3 also shows "Registration" software button for instructing the mobile phone 9 to send inputted information to the mediation center apparatus 1. When the owner of mobile phone 9, in the screen T3, inputs a telephone number, a registration name, and a password, and selects "Registration" button and pushes a predetermined key such as an Enter key, the mobile phone 9 sends the field information, the telephone number, the registration name, and the password to the mediation center apparatus 1 via the mobile packet communication network 5 as registration request information (Step S30). The field information is a series of numbers corresponding to the fields selected by the owner of the mobile phone 9 in the screens shown during the new registration process. The telephone number is a number of a mobile phone used by the answerer when s/he answers questions, and usually it is the telephone number of the mobile phone 9. The registration name is a name to be displayed in a display unit of a mobile phone of a questioner when the questioner selects answerers. The answerer can freely decide the registration name, and s/he can register either his/her real name or his/her nickname. The password is a 4-digit number which is decided by the person who registers. In this embodiment, 4-digit numbers are used for passwords, but passwords can also be letters, symbols, or combinations thereof, and a number of digits in a password can be other than 4.

When the wireless communication unit of the mediation center apparatus 1 receives the registration request information as explained above, it transfers the information to the registration/inquiry unit 2 under control of the microcomputer, and the registration/inquiry unit 2 determines whether the received registration request information contains appropriate information. If information contained in the registration request information has any problems such as, for example, a number of digits of the received telephone number is not enough, the registration/inquiry unit 2 sends data of a screen for an input error message in CHTML format to the mobile phone 9 via the mobile packet communication network 5. The screen has a "Re-registration" software button and a "Cancel" software button. In a case that the owner of the mobile phone 9 selects the "Re-registration" button, the screen T2 is displayed again, and the operation in Step S30 as explained above is repeated. In a case that the owner of the mobile phone 9 selects the "Cancel" button, the new registration operation finishes and a display of the mobile phone 9 returns to its normal state.

If the received registration request information contains all proper information, the registration/inquiry unit 2 adds a new record in the answerer database unit 8, and writes the telephone number, the registration name, and the password, which are contained in the registration request information, in Telephone Number UID, Answerer Name KM, and Password CRI of the new record. Also, it converts the field information contained in the registration request information into a corresponding field name, and writes the converted field name in Answer Field MAJ of the new record (Step S40). After the registration/inquiry unit 2 completes the operation as explained above, it sends data of a screen for a registration completion notice in CHTML format to the mobile phone 9 via the mobile packet communication network 5 (Step S50).

The above operations are performed by the mobile phone 9 and the mediation center apparatus 1 when the owner of mobile phone 9 registers himself/herself as an answerer at the mediation center apparatus 1 using the mobile phone 9.

C-2. Operations of Mediation

Figure 5:
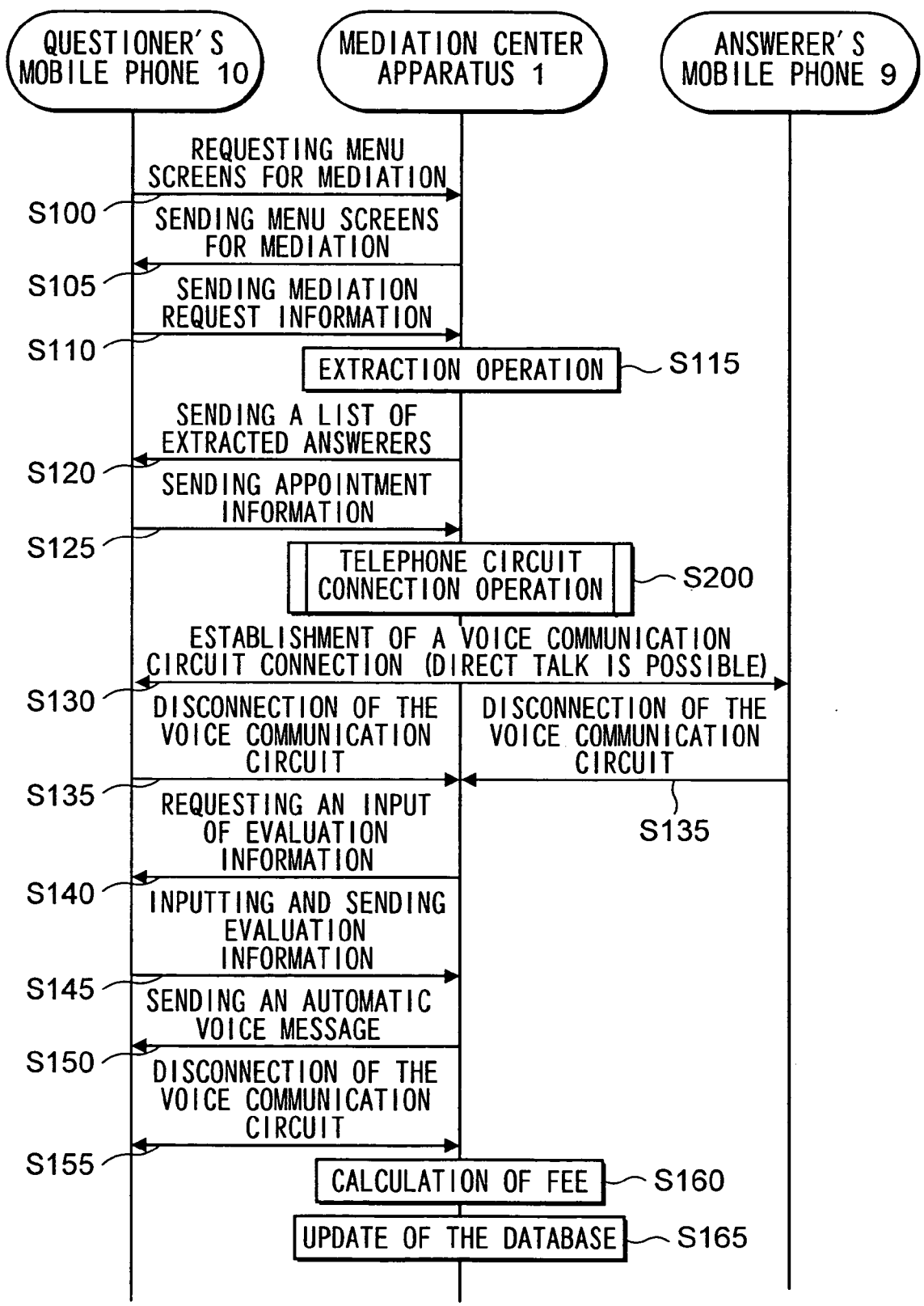
FIG. 5 is a sequence chart illustrating operations of a questioner's mobile phone, a mediation center apparatus and an answerer's mobile phone during a question mediation step in one embodiment of the present invention.
Figure 6A:
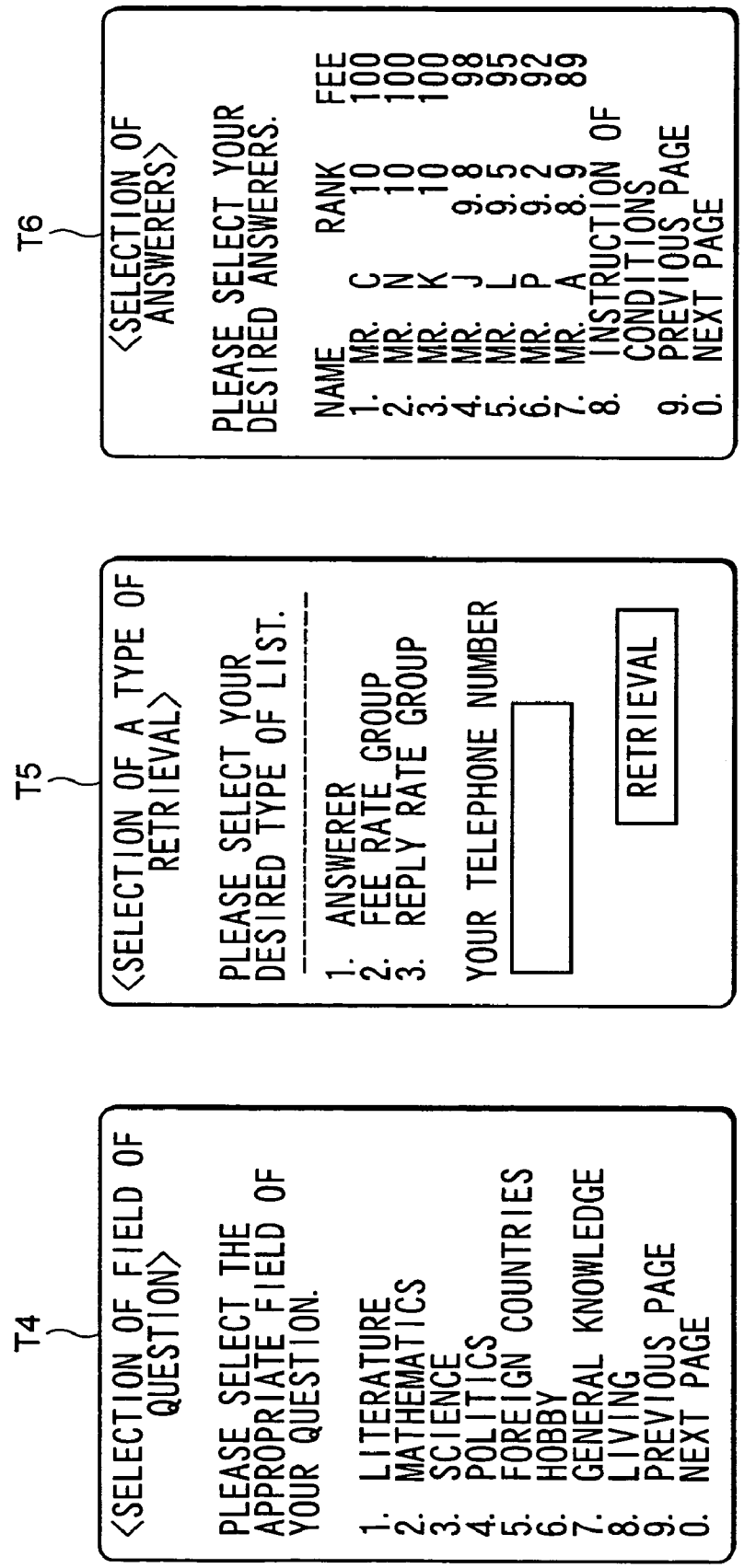

The following operations are performed when a questioner sends a request to the mediation center apparatus 1 for a mediation service for consultation using a mobile phone 10 in this embodiment, as shown in FIGS. 5 and 6. FIG. 5 shows a sequence chart of operations performed in the mobile phone 10, which is owned by the questioner, the mediation center apparatus 1, and mobile phones 9 which are owned by answerers. FIGS. 6A, 6B, and 6C show screens which are displayed in the display unit of the mobile phone 9. In the following explanation, information relating to many answerers has been already registered in the answerer database unit 8 by the operations for answerer registration as explained above, and the information is current.

When a questioner wants to request a mediation service, the questioner first connects his/her mobile phone 10 to the mobile packet communication network 5 by manipulating its ten key pad, etc., and requests the mediation center apparatus 1 to provide data of menu screens for a mediation via the mobile packet communication network 5 (Step S100). More concretely, s/he carries out such an operation by inputting a URL for identifying an address in the communication network where there is data of menu screens for a mediation in CHTML format, in mobile phone 10 and by sending it to the mobile packet communication network 5.

When the mediation center apparatus 1 receives the request for data of menu screens for a mediation from the mobile phone 10, it sends the data of menu screens for a mediation in CHTML format to the mobile phone 10 via the mobile packet communication network 5 (Step S105). When the mobile phone 10 receives the data, it displays, in its display unit, a screen T4 of FIG. 6A as a menu screen for a mediation.

The screen T4 shows many predetermined fields, such as "1. Literature", "2. Mathematics", "3. Science", and so on. Moreover, in this example, it also shows "9. Previous Page" and "0. Next Page" which are used to change pages since the menu has many pages. The owner of the mobile phone 10 selects, from these fields, a field to which his/her question belongs, and inputs a corresponding number using the key pad in the manipulation unit. When the number is inputted, the mobile phone 10 displays a screen showing more detailed fields in the selected field. The owner of the mobile phone 10 selects a field in the screen and inputs a corresponding number of the selected field again. This operation is repeated until the menu screens show fields in the most detailed category and the owner of the mobile phone 10 selects the most detailed category within a field.

When the owner of the mobile phone 10 selects the most detailed category within a field in the menu screens for a mediation as explained above, it displays a screen T5 of FIG. 6A. The screen T5 shows "1. Answerer", "2. Fee Rate Group", and "3. Reply Rate Group", each of which corresponds to a way of selecting answerers. "1. Answerer" means a way of selecting answerers from a list of answerers, "2. Fee Rate Group" means a way of selecting answerers whose consultation fee rates are in a certain range by group, and "3. Reply Rate Group" means a way of selecting answerers whose reply rates are in a certain range by group. The screen T5 also shows "Your Telephone Number" item for inputting a telephone number of the owner of the mobile phone 10, and "Retrieval" software button for sending inputted information to the mediation center apparatus 1. When the owner of the mobile phone 10, in the screen T5, inputs a number corresponding to a way of selecting answerers and a telephone number, and selects "Retrieval" button and pushes a predetermined key such as an Enter key, the mobile phone 10 sends the field information, the number corresponding to a way of selecting answerers, and the telephone number to the mediation center apparatus 1 via the mobile packet communication network 5 as mediation request information (Step S110). The field information is a series of numbers corresponding to the fields selected by the owner of the mobile phone 10 in the menu screens for a mediation. The telephone number is a number of a mobile phone which the questioner uses when s/he asks questions, and usually it is the telephone number of the mobile phone 10.

When the wireless communication unit of the mediation center apparatus 1 receives the mediation request information as explained above, it transfers the information to the retrieval process unit 3 under control of the microcomputer, and the retrieval process unit 3 checks if the received mediation request information contains proper information. If information contained in the mediation request information has any problems such that, for example, a number of digits of the telephone number received is not enough, the retrieval process unit 3 sends data of a screen for an input error message in CHTML format to the mobile phone 10 via the mobile packet communication network 5. The screen has a "Re-registration" software button and a "Cancel" software button. In a case that the owner of the mobile phone 10 selects "Re-registration" button, the screen T4 is displayed again, and the operation in Step S110 as explained above is repeated. In a case that the owner of the mobile phone 10 selects the "Cancel" button, the operation of mediation request is finished and the mobile phone 10 displays a screen of its normal state.

If the received mediation request information contains all proper information, the retrieval process unit 3 initially stores the telephone number contained in the received mediation request information (referred to as "the questioner telephone number" hereafter) temporarily. Then the retrieval process unit 3 converts the field information contained in the mediation request information into a corresponding field name, and extracts, from the answerer database unit 8, records whose Answer Field MAJ values match the converted field name. Then the retrieval process unit 3 extracts, from the extracted records, records whose Reply Possibility Flag ACT values are "1", namely records which are set in a condition of being able to receive questions (Step S115). Then the mediation center apparatus 1 and the mobile phone 10 perform the following operations on the basis of the number corresponding to a way of selecting answerers which is contained in the mediation request information.

In a case that the number corresponding to a way of selecting answerers, which is contained in the mediation request information, is "1", namely "Answerer" is selected, the retrieval process unit 3 initially sorts all of the records which were extracted at Step S115, as explained above, in the descending order of their Evaluation Rank RK values, and stores the sorted set of extracted records (hereafter referred to as "the extracted records 1") temporarily. Then the retrieval process unit 3 sends data for displaying Answerer Name KM values, Evaluation Rank RK values, and Consultation Fee Rate PRI values (see FIG. 2) in a list to the mobile phone 10 in CHTML format via the mobile packet communication network 5 (Step S120). When the mobile phone 10 receives the data, it displays a screen T6 shown in FIG. 6A in its display unit. The screen T6 shows names, evaluation ranks, and fee rates of answerers whose registered fields, where they can answer, are the same as the field which the owner of the mobile phone 10 selected in Step S10 as explained above, in a list in the descending order of evaluation ranks. The evaluation ranks show evaluations given to each answerer in the past in a figure between 1 and 10, and the fee rates show fees per minute in yen charged for a voice communication with each of answerers. Then the owner of the mobile phone 10 selects answerers who s/he wants to answer questions by inputting the corresponding numbers shown in the screen T6. In this operation, the owner of the mobile phone 10 can select one or more answerers. When the owner of the mobile phone 10 completes this operation of selecting answerers and pushes a predetermined key in the manipulation unit such as an Enter key, the mobile phone 10 displays a screen T8 of FIG. 6B. The screen T8 shows a "Maximum Continuous Call Times" item and "Call" software button. "Maximum Continuous Call Times" is an item for instructing how many persons at the maximum are to be called if a trial of connection to a selected answerer fails. After the owner of the mobile phone 10 inputs a number of times desired in "Maximum Continuous Call Times" item, s/he selects "Call" button and pushes a predetermined key in the manipulation unit, such as an Enter key, and sends appointment information of answerers and the number of maximum call times to the retrieval process unit 3 via the mobile packet communication network 5 (Step S125). The appointment information is a series of numbers corresponding to the answerers selected by the owner of the mobile phone 10. When the retrieval process unit 3 receives the appointment information of answerers and the number of maximum call times, it retrieves, from the extracted records 1 stored temporarily in the preceding operation, records which are appointed by the appointment information, and sends Telephone Number UID values of the retrieved records to the telephone circuit connection unit 4 together with the received number of maximum call times and the questioner telephone numbers which were received from the mobile phone 10 and stored temporarily in Step S110, as explained above. For example, if the appointment information contains "5" and "7", the retrieval process unit 3 sends Telephone Number UID values of the 5th record and 7th record of the extracted records 1 to the telephone circuit connection unit 4.

In a case that the number corresponding to a way of selecting answerers, which is contained in the mediation request information, is "2" in Step S115 as explained above, namely "Fee Rate Group" is selected, initially the retrieval process unit 3 extracts, from all of the records which were extracted at Step S115, records whose Consultation Fee Rate PRI values (see FIG. 2) are in a range between 100 and 96, and which are stored in the extracted records as "Group 1" and a number of the extracted records as "Number of Persons 1" temporarily. Similarly, the retrieval process unit 3 extracts, from all of the records which were extracted at Step S115, records whose Consultation Fee Rate PRI values are in a range between 95 and 91, a range between 90 and 86, . . . , a range between 5 and 1, and stores temporarily the extracted records as "Group 2", "Group 3", . . . , "Group 20", respectively, and numbers of the extracted records as "Number of Persons 2", "Number of Persons 3", . . . , "Number of Persons 20", respectively. Then the retrieval process unit 3 sends data for displaying the values of "Number of Persons 1", "Number of Persons 2", . . . , "Number of Persons 20" in a list to the mobile phone 10 in CHTML format via the mobile packet communication network 5 (Step S120). When the mobile phone 10 receives the data, it displays a screen T7 of FIG. 6B in its display unit. The screen T7 shows numbers of available answerers whose registered fields are the same as the field which the owner of the mobile phone 10 selected in Step S110, and whose fee rates per minute in yen are in a range between 100 and 96, between 95 and 91, and so on, in a list in descending order of consultation fee rates. The owner of the mobile phone 10 selects answerers in a group of a fee rate range by inputting the corresponding number shown in the screen T7. When the owner of the mobile phone 10 inputs a number corresponding to a fee rate range of answerers which s/he wishes to contact in the screen T7, the mobile phone 10 displays a screen T8 shown in FIG. 6B. The screen T8 shows "Maximum Continuous Call Times" item and "Call" software button. After the owner of the mobile phone 10 inputs a number of times desired in "Maximum Continuous Call Times" item, s/he selects "Call" button and pushes a predetermined key in the manipulation unit, such as an Enter key, and sends appointment information of answerers and the number of maximum call times to the retrieval process unit 3 via the mobile packet communication network 5 (Step S125). The appointment information is a number corresponding to the selected fee rate range. When the retrieval process unit 3 receives the appointment information of answerers and the number of maximum call times, it reads out a group of records appointed by the appointment information from the groups stored temporarily in the preceding operation such as "Group 1", "Group 2", and so on. For example, if the appointment information contains "3", the retrieval process unit 3 reads out "Group 3". Then the retrieval process unit 3 sends Telephone Number UID values of all of the records in the group read out to the telephone circuit connection unit 4 together with the received number of maximum call times and the questioner telephone number which were received from the mobile phone 10 and stored temporarily in Step S110 as explained above.

In a case that the number corresponding to a way of selecting answerers, which is contained in the mediation request information, is "3" in Step S15 as explained above, namely "Reply Rate Group" is selected, the retrieval process unit 3 initially extracts, from all of the records which were extracted at Step S115, records whose Reply Rate RES values (see FIG. 2) are in a range between 100 and 96, and stored temporarily in the extracted records as "Group 1" and a number of the extracted records as "Number of Persons 1". Similarly, the retrieval process unit 3 extracts, from all of the records which were extracted at Step S115, records whose Reply Rate RES values are in a range between 95 and 91, a range between 90 and 86, . . . , a range between 5 and 1, and stores temporarily the extracted records as "Group 2", "Group 3", . . . , "Group 20", respectively, and numbers of the extracted records as "Number of Persons 2", "Number of Persons 3", . . . , "Number of Persons 20", respectively. Then the retrieval process unit 3 sends data for displaying the values of "Number of Persons 1", "Number of Persons 2", . . . , "Number of Persons 20" in a list to the mobile phone 10 in CHTML format via the mobile packet communication network s (Step S120). When the mobile phone 10 receives the data, it displays a screen T9 in its display unit shown in FIG. 6B. The screen T9 shows numbers of answerers whose registered fields, where they can answer, are the same as the field which the owner of the mobile phone 10 selected in Step S110, and whose percentage reply rates are in a range between 100 and 96, between 95 and 91, and so on, in a list in the descending order of reply rates. The owner of the mobile phone 10 selects answerers in which the group of reply rate range inputting corresponding number is shown in the screen T9. When the owner of the mobile phone 10 inputs a number corresponding to a reply rate range of answerers which s/he wishes to contact in the screen T9, the mobile phone 10 displays a screen T8 shown in FIG. 6B. The screen T8 shows "Maximum Continuous Call Times" item and "Call" software button. After the owner of the mobile phone 10 inputs a number of times desired in "Maximum Continuous Call Times" item, s/he selects "Call" button and pushes a predetermined key in the manipulation unit, such as an Enter key, and sends appointment information of answerers and the number of maximum call times to the retrieval process unit 3 via the mobile packet communication network 5 (Step S125). The appointment information is a number corresponding to the selected reply rate range. When the retrieval process unit 3 receives the appointment information of answerers and the number of maximum call times, it reads out a group of records appointed by the appointment information from the groups stored temporarily in the preceding operation such as "Group 1", "Group 2", and so on. For example, if the appointment information contains "3", the retrieval process unit 3 reads out "Group 3". Then the retrieval process unit 3 sends Telephone Number UID values of all of the records in the group read out to the telephone circuit connection unit 4 together with the received number of maximum call times and the questioner telephone number which were received from the mobile phone 10 and stored temporarily in Step S110 explained above.

Figure 7:
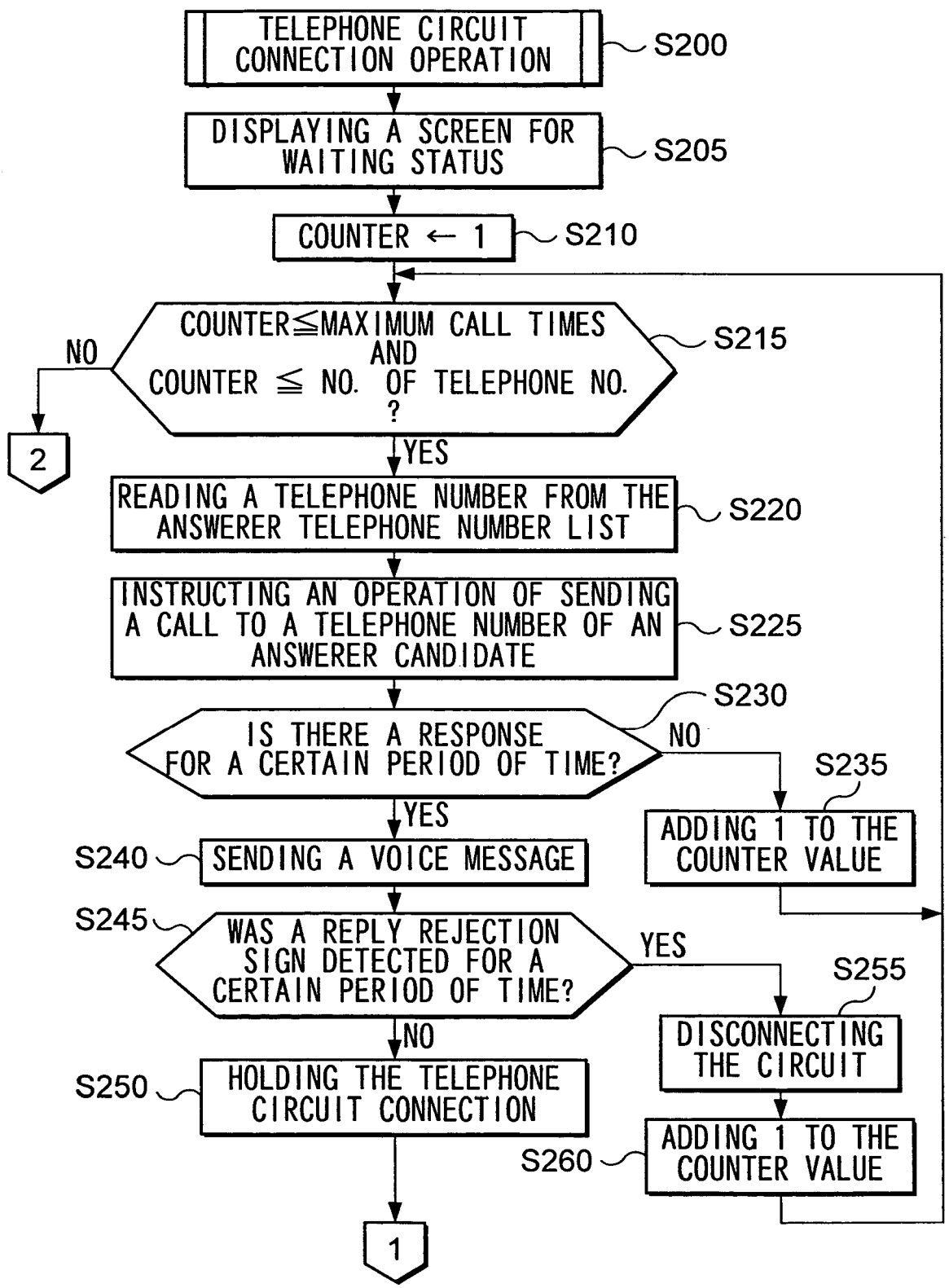
FIG. 7 and FIG. 8 are flowcharts illustrating procedures of telephone circuit connecting.

When the retrieval process unit 3 sends Telephone Number UID values (referred to as "the answerer telephone number list" hereafter), the number of maximum call times (hereafter referred to as "the maximum call times"), and the questioner telephone number to the telephone circuit connection unit 4, as explained above, and the telephone circuit connection unit 4 receives the information, the telephone circuit connection unit 4 stores the received information temporarily and starts a telephone circuit connection step (Step S200). Operations of the telephone circuit connection unit 4 in the telephone circuit connection step are explained in the below with reference to flowcharts in FIGS. 7 and 8.

First, the telephone circuit connection unit 4 causes the mobile phone 10 to display a screen T10 shown in FIG. 6C by sending the necessary data in CHTML format to mobile phone 10 via the mobile packet communication network 5 (Step S205). Then the telephone circuit connection unit 4 creates a call counter in a temporary storage area for counting call times, and sets "1" in the call counter (Step S210). A value of the call counter is updated according to subsequent operations.

Next, the telephone circuit connection unit 4 judges whether a value of the call counter is the same as or smaller than both of the maximum call times and judges a number of telephone numbers in the answerer telephone number list (Step S215).

In a case that the telephone circuit connection unit 4 judges that the value of the call counter is the same as or smaller than both of the maximum call times, and judges the number of telephone numbers in the answerer telephone number list, first, it counts the same value of the call counter from the top of the answerer telephone number list, and reads out a telephone number. Namely, for example, if the value of the call counter is "3", the telephone circuit connection unit 4 reads out the third telephone number in the answerer telephone number list (Step S220). Then the telephone circuit connection unit 4 calls a mobile phone 9 whose telephone number was read out via the mobile telecommunication network 6 (Step S225). After the telephone circuit connection unit 4 sends a call on the basis of the read telephone number, it judges whether the target mobile phone 9 responded to the call in a predetermined period of time (Step S230). In a case that the telephone circuit connection unit 4 judges that the target mobile phone 9 responded to the call in the predetermined period of time, it moves to Step S240 as explained below. On the other hand, in a case that the telephone circuit connection unit 4 judges that the target mobile phone 9 did not respond to the call in the predetermined period of time, it cancels the call to the mobile phone 9, reads a value of the call counter, and updates a value of the call counter with a number which is calculated by adding "1" to the original value of the call counter (Step S235). Then the telephone circuit connection unit 4 retrieves, from the answerer database unit 8, a record whose Telephone Number UID value is the same as the telephone number of the mobile phone 9 to which the telephone circuit connection unit 4 sent a call in Step S225, and updates Reply Rate RES value of the retrieved record. Then it moves to Step S215 to try to call the next answerer candidate.

In a case that the target mobile phone 9 responds to the call in the predetermined period of time in Step S230, the telephone circuit connection unit 4 sends an automatic voice guidance to the mobile phone 9 which responded to the call, which indicates that a questioner wants to talk to the owner of the mobile phone 9, and requests him/her to respond if s/he can reply the questioner by pushing a predetermined key (Step S240). One example of such a voice guidance message is "Now, you have a request from a questioner. If you cannot reply to it, please push key "1". If you stand by without pushing anything, your telephone will be connected to the questioner." In the following explanation, if an answerer pushes "1", it means s/he replies, and otherwise, it means s/he does not reply.

Next, the telephone circuit connection unit 4 judges whether key "1" of the target mobile phone 9 was pushed in a predetermined period of time (Step S245). In a case that it judges that key "1" of the target mobile phone 9 was pushed in the predetermined period of time in Step S245, since an answerer who owns the target mobile phone 9 declined to reply intentionally, the telephone circuit connection unit 4 disconnects the telephone circuit with the mobile phone 9 via the mobile telecommunication network 6 (Step S255), and obtains a value of the call counter and updates a value of the call counter with a number which is calculated by adding "1" to the original value of the call counter (Step S260). Then the telephone circuit connection unit 4 retrieves, from the answerer database unit 8, a record whose Telephone Number UID value is the same as the telephone number of the mobile phone 9 whose telephone circuit was disconnected in Step S255, and updates Reply Rate RES value of the retrieved record. Then the telephone circuit connection unit 4 moves to Step S215 to try to call the next answerer candidate.

On the other hand, in a case that the telephone circuit connection unit 4 judges that key "1" of the target mobile phone 9 was not pushed in the predetermined period of time in Step S245, since an answerer who owns the target mobile phone 9 did not decline to reply, the telephone circuit connection unit 4 holds the voice communication circuit connection with the mobile phone 9 via the mobile telecommunication network 6 (Step S250), and calls the mobile phone 10, whose telephone number is the questioner telephone number which was received from the retrieval process unit 3, via the mobile packet communication network 5 (Step S270). Then the telephone circuit connection unit 4 judges whether the mobile phone 10 responded to the call in a predetermined period of time (Step S275).

In a case that the telephone circuit connection unit 4 judges that the mobile phone 10 did not respond to the call in the predetermined period of time in Step S275, since it failed to establish a voice communication circuit connection with the mobile phone 10 of the questioner, it sends a message of apology as an automatic voice guidance message to the mobile phone 9 of the answerer which is held after Step S250 (Step S280), and disconnects the voice communication circuit with the mobile phone 9 which is held (Step S285), and finishes the telephone circuit connection step. One example of such a message of apology is "We express our apology that we failed to call the questioner. After this message ends, the line will be disconnected automatically."

On the other hand, in a case that the telephone circuit connection unit 4 judges that the mobile phone 10 responded to the call in the predetermined period of time in Step S275, since it succeeded in establishing a telecommunication circuit connection with the mobile phone 10 of the questioner, it brings to notice of the mobile phone 10 of the questioner that it succeeded in connecting to an answerer by an automatic voice guidance message (Step S290). One example of such a message is "We succeeded in connecting to an answerer. Please hold the line."

After the telephone circuit connection unit 4 sends an automatic voice guidance message in Step S290, it interconnects the established voice communication circuit connection with the mobile phone 10 of the questioner and the voice communication circuit connection with the mobile phone 9 of the answerer held after Step S250. Consequently a voice communication circuit connection between the mobile phone 10 of the questioner and the mobile phone 9 of the answerer via the mobile telecommunication network 6 is established, and the questioner and the answerer are enabled to have a conversation (Step S295). Then the telephone circuit connection unit 4, from the answerer database unit 8, retrieves a record whose Telephone Number UID value is the same as the telephone number of the mobile phone 9 with which the telephone circuit connection unit 4 established a voice communication circuit connection in Step S295, and updates Reply Rate RES value of the retrieved record. Moreover, the telephone circuit connection unit 4 sends information of the telephone number of the mobile phone 9 of the answerer, with which it established a voice communication circuit connection in Step S295, and the telephone number of the mobile phone 10 of the questioner, to the evaluation/billing unit 7. When the evaluation/billing unit 7 receives the information of the telephone numbers, it stores the information temporarily, and starts to log the connection time.

On the other hand, in Step S215, in a case that the telephone circuit connection unit 4 judges that the value of the call counter is larger than the maximum call times or more than the number of telephone numbers in the answerer telephone number list, it causes the display unit of the mobile phone 10 of the questioner to display a screen T11 shown in FIG. 6C, which notifies a failure of call by sending necessary data in CHTML format to mobile phone 10 via the mobile packet communication network 5 (Step S265), since the telephone circuit connection unit 4 has already tried to call the maximum number of continuous call times given by the questioner, or it has already tried to call all answerer candidates selected by the questioner, but there has been no positive reply from them. Then the telephone circuit connection unit 4 finishes the telephone circuit connection step. The screen T11 shows "1. Re-input of Retrieval Condition" and "2. Repeat from the Beginning", and if the owner of the mobile phone 10 pushes key "1", the telephone circuit connection unit 4 moves to Step S110 as explained above, and if the owner of the mobile phone 10 pushes key "2", the telephone circuit connection unit 4 moves to Step S100 as explained above.

Figure 8:
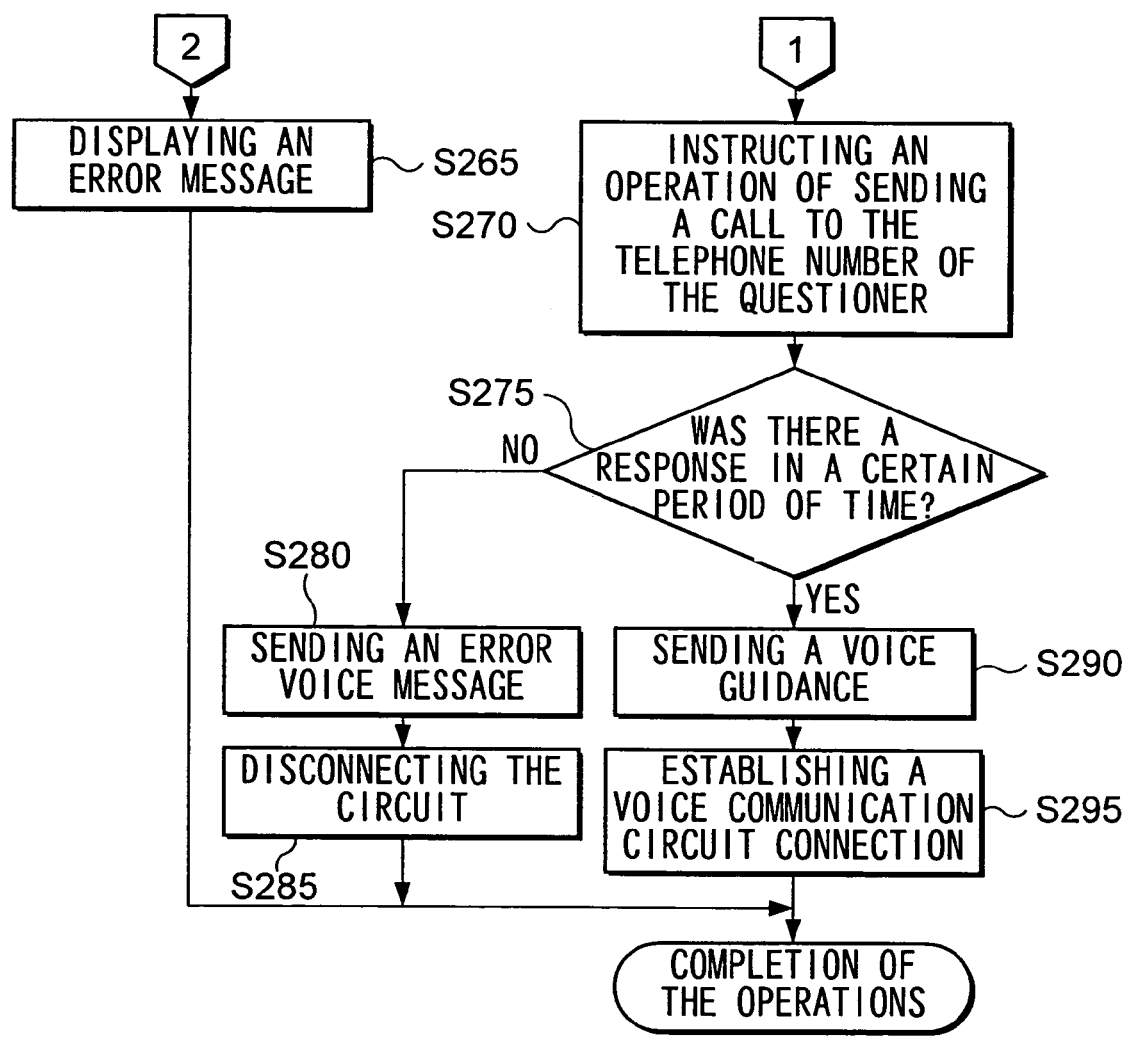

With reference to FIG. 5 explanations given here are operations performed by the mobile phone 10, the mediation center apparatus 1, and the mobile phone 9, after a telephone circuit connection step is successful in Step S295 in FIG. 8 as explained above, and a voice communication circuit connection between the mobile phone 10 of the questioner and the mobile phone 9 of the answerer is established. After the voice communication circuit connection between the mobile phone 10 and the mobile phone 9 is established (Step S130), the questioner and the answerer exchange questions and answers directly by voice communication. When the voice communication is finished and the owner of the mobile phone 9 or the owner of the mobile phone 10 gives an instruction to terminate the voice communication circuit connection (Step S135), the telephone circuit connection unit 4 releases the connection of the mobile phone 9 of the answerer to the mobile telecommunication network 6, and at the same time, it establishes a voice communication circuit connection between the mobile phone 10 and the mediation center apparatus 1 by switching the connection of the mobile phone 10 in the mobile telecommunication network 6 to the mediation center apparatus 1.

When the telephone circuit connection unit 4 establishes the voice communication circuit connection between the mediation center apparatus 1 and the mobile phone 10 as explained above, the evaluation/billing unit 7 stops counting the connection time which it continued and stores the result of the counting temporarily, and at the same time, it sends an automatic voice guidance message which requests for an evaluation input relating to the answerer (Step S140). One example of such a message is "Now, you are requested to evaluate the contents of the answers which you have just received from the answerer in 10 steps between 0 and 9. Please push one of the ten keys between 0 and 9 according to your evaluation after you hear a beep. A larger number means a higher evaluation. If you skip inputting your evaluation, 5 will be registered as your evaluation. . . . (beeping sound)".

If the questioner pushes a key in the manipulation unit of the mobile phone 10 responding to the automatic voice guidance, a tone signal corresponding to the pushed key is sent from the mobile phone 10 to the evaluation/billing unit 7 via the mobile telecommunication network 6 (Step S145). When the evaluation/billing unit 7 receives the tone signal, it stores an evaluation value corresponding to the tone signal temporarily. If the evaluation/billing unit 7 does not receive any valid tone signal in a predetermined period of time, it stores the default value "6" temporarily as an evaluation value since key "5" corresponds to evaluation value "6" as explained previously. Next, the evaluation/billing unit 7 sends an automatic voice message of operation completion to the mobile phone 10 of the questioner (Step S150), and sends a disconnection request of the voice communication circuit connection to the telephone circuit connection unit 4. When the telephone circuit connection unit 4 receives the disconnection request of the voice communication circuit connection, it disconnects the voice communication circuit connection between the mobile phone 10 and the mediation center apparatus 1 (Step S155).

After Step S155, the evaluation/billing unit 7 retrieves, from the answerer database unit 8, a record whose Telephone Number UID value is the same as the telephone number of the mobile phone 9 of the answerer, which it received from the telephone circuit connection unit 4 in the preceding step, and calculates an amount to be charged to the mobile phone 10 of the questioner and a reward to the user of the mobile phone 9 using Consultation Fee Rate PRI value of the retrieved record and the result of the counting of connect time stored temporarily in the preceding step (Step S160). Information of the bill and the reward calculated here will be sent to a server system (not shown) which manages requests and payment of bills, and handles them together with other telephone bills. Then the evaluation/billing unit 7 calculates a new evaluation rank, a new consultation fee rate, and a new real consultation case number using the evaluation value stored temporarily in the preceding step, Evaluation Rank RK value of the retrieved record, and Real Consultation Case Number SUM value of the retrieved record, and updates Evaluation Rank RK value, Consultation Fee Rate PRI value, and Real Consultation Case Number SUM value of the retrieved record with the calculated values, respectively (Step S165).

These are the operations performed by the Mediation Consultancy System when a questioner requests the mediation center apparatus 1 to provide a mediation service for consultation using a mobile phone 10.

D. Advantages of This Embodiment

According to this embodiment, a questioner can obtain information of answerers who can answer questions of the questioner from among a lot of information of answerers who are registered with the mediation center apparatus, just by sending information of a field to which his/her questions belong to the mobile telecommunication network using his/her mobile phone. Moreover, the questioner can perform voice communications with his/her desired answerers just by selecting them on the basis of the received information of answerers and sending the result of the selection to the mobile telecommunication network using his/her mobile phone. Consequently, the questioner can receive answers for his/her questions by simple operations.

In this embodiment, a questioner can appoint many answerers by person and by group, and in a case that one of the appointed answerers cannot reply, an attempt will be made to automatically establish a voice communication connection with another answerer among the appointed answerers, and the attempt will be repeated. Therefore, the questioner has a high possibility of establishing voice communications with an answerer in a single operation.

Because the mediation consultancy service realized in this embodiment uses mobile phones, a questioner can obtain answers for his/her questions anywhere; even while s/he is walking.

In this embodiment, operations such as an input of field of questions are carried out in dialogue screens made by data in CHTML format using the mobile packet communication network. Therefore, a user can input required data, such as figures, on a screen of their mobile phone, and operations are easy to perform.

In this embodiment, consultation between a questioner and an answerer is performed by voice communications using the mobile telecommunication network. Therefore, both the questioner and answerer can communicate even nuances of their ideas, which are difficult to communicate quickly in other ways, such as by e-mail.

In this embodiment, there is no need for a questioner to register himself/herself in advance. Therefore, a questioner can make use of the mediation consultancy service realized by this embodiment without any complications.

In this embodiment, an answerer can obtain requests of consultation from questioners just by following a simple registration procedure using his/her mobile phone, and can not only utilize his/her knowledge and experiences but also can expect to receive rewards for his/her services as an answerer. Moreover, since mobile phones are used in the mediation consultancy system of this embodiment, an answerer can register himself/herself anytime and anywhere as an answerer and provide his/her services as an answerer.

In this embodiment, the mediation center apparatus calls a mobile phone of a questioner and a mobile phone of an answerer first, and then it connects their lines. Therefore, it can realize direct voice communication without revealing personal information of the questioner and the answerer, such as their telephone numbers. Consequently, both the questioner and the answerer can make use of the service while being sure of their privacy and security.

In this embodiment, there is no complication of fee negotiation because a consultation fee rate of each answerer is offered to a questioner in advance, and the questioner can select answerers by referring to their consultation fee rate. Consequently, both answerers and questioners can make use of the service without hesitation.

In this embodiment, ensuring the quality offered by answerers is important since the answerers have registered on their own. In the mediation consultancy system of this embodiment, however, there is a system by which questioners evaluate the answerers, consultation fee rates are calculated on the basis of the evaluation, and rewards according to the calculated consultation fee rates are paid to the answerers. Therefore, the answerers have an incentive to improve their services, and answerers of low quality are dismissed automatically and only qualified answerers can remain. Consequently, undesirable situations such as payment of high consultation fees for low quality services can be prevented.

E. Variations

In addition to the embodiment explained above, the present invention is open to a variety of modifications in the scope of conception of the invention. The following are some such modifications.

<Modification 1>

In the embodiment explained above, consultation fee rates are calculated according to evaluation ranks recorded in the answerer database unit, but only in the case that an answerer wishes to offer a lower consultation fee rate than the consultation fee rate calculated by the default method, the answerer may set his/her proposed rate as his/her own consultation fee rate.

<Modification 2>

In the embodiment explained above, when an answerer notifies the mediation center apparatus of his/her status whether s/he can accept questions, some charge for using the mobile packet communication network is incurred, since the answerer responds by using keys or software buttons. However, an answerer may notify the mediation center apparatus of his/her status whether s/he can accept questions without any charge by use of a function of dialing a predetermined phone number which the mobile phone of the answerer has. More concretely, on the side of the mediation center apparatus, two telephone numbers for exclusive use are prepared, one of which is used to change Reply Possibility Flag ACT values of the answerer database unit into a status that it is possible to accept questions, and the other of which is used to change Reply Possibility Flag ACT values of the answerer database unit into a status that it is not possible to accept questions. Apparatus connected to these telephone numbers is set to receive only notification of dialing a phone number. Consequently, an answerer can notify his/her phone number to the apparatus only by calling the telephone numbers for exclusive use, and the apparatus can change Reply Possibility Flag ACT values of the answerer database unit, but no charge is incurred.

Moreover, the system may be configured to have a function that an answerer can register in advance the time when s/he can accept questions, when s/he registers himself/ herself as an answerer or s/he changes his/her registered contents. By such a function, it becomes unnecessary for the answerer to frequently notify the mediation center apparatus of his/her status as to whether s/he can accept questions, and the system becomes more convenient.

The invention claimed is:

1. A mediation apparatus comprising:
    registration request receiving means for receiving a registration request which contains telephone number data and answer field data from each of a plurality of mobile phones of answerer candidates via a mobile telecommunication network;
    candidate data storing means for storing candidate data sets, each of which contains telephone number data and answer field data which are contained in a registration request received by said registration request receiving means;
    mediation request receiving means for receiving a mediation request, which contains telephone number data and question field data, from each of a plurality of mobile phones of questioners via said mobile telecommunication network;
    extracting means for extracting, when said mediation request receiving means receives one mediation request from one mobile phone of one questioner, one or more candidate data sets which contain answer field data corresponding to question field data which is contained in said one mediation request, from candidate data sets stored by said candidate data storing means;

acquiring means for acquiring telephone number data of one mobile phone of one answerer from candidate data sets which are extracted by said extracting means;

connection establishing means for establishing a communication circuit connection in said mobile telecommunication network between said one mobile phone of said one answerer and said one mobile phone of said one questioner, on the basis of said telephone number data acquired by said acquiring means and said telephone number data contained in said one mediation request;

evaluation data receiving means for receiving evaluation data, which indicates evaluation of said one answerer, from said one mobile phone of said one questioner via said mobile telecommunication network;

evaluation index storing means for storing an evaluation index, which is made on the basis of said evaluation data which indicates evaluation of said one answerer, linked to a candidate data set corresponding to said one answerer which is stored by said candidate data storing means; and, calculating means for calculating at least one of (a) reward for said one answerer and (b) bill for said one questioner, with regard to a communication using said communication circuit connection, on the basis of an evaluation index which is stored by said evaluation index storing means linked to the candidate data set corresponding to said one answerer.

2. A mediation apparatus according to claim 1, wherein:
said calculating means calculates at least one of (a) reward for said one answerer and (b) bill for said one questioner, on the basis of an evaluation index which is stored by said evaluation index storing means before said evaluation data receiving means receives said evaluation data from said one mobile phone of said one questioner.

3. A mediation apparatus according to claim 1, wherein said acquiring means comprises:
answerer candidate guide data transmitting means for transmitting answerer candidate guide data, which indicates candidate data sets which are extracted by said extracting means, to said one mobile phone of said one questioner, via said mobile telecommunication network;

answerer candidate appointment data receiving means for receiving answerer candidate appointment data which appoints one or more desired candidate data sets among candidate data sets which are indicated by said answerer candidate guide data, from said one mobile phone of said one questioner via said mobile telecommunication network; and, telephone number acquiring means for acquiring telephone number data of one mobile phone of one answerer from one candidate data set among candidate data sets which are appointed by said answerer candidate appointment data.

4. A mediation apparatus according to claim 1, wherein said acquiring means comprises:
condition data receiving means for receiving, when said extracting means extracts a plurality of candidate data sets from candidate data sets stored by said candidate data storing means, condition data which indicate a condition for grouping the plurality of candidate data sets extracted by said extracting means into a plurality of groups, from said one mobile phone of said one questioner, via said mobile telecommunication network;

grouping means for grouping the plurality of candidate data sets extracted by said extracting means into a plurality of groups on the basis of said condition data;

answerer candidate group guide data transmitting means for transmitting answerer candidate group guide data, which indicates groups which are made by said grouping means, to said one mobile phone of said one questioner, via said mobile telecommunication network;

answerer candidate group appointment data receiving means for receiving answerer candidate group appointment data, which appoints one or more desired groups from among groups which are indicated by said answerer candidate group guide data, from said one mobile phone of said one questioner, via said mobile telecommunication network; and, telephone number acquiring means for acquiring telephone number data of one mobile phone of one answerer from one candidate data set among candidate data sets which are contained in groups appointed by said answerer candidate group appointment data.

5. A mediation apparatus according to claim 1, wherein said connection establishing means comprises:
first connecting means for establishing a communication circuit connection in said mobile telecommunication network with said one mobile phone of said one answerer by sending a call to said one mobile phone of said one answerer on the basis of the telephone number data acquired by said acquiring means;

second connecting means for establishing a communication circuit connection in said mobile telecommunication network with said one mobile phone of said one questioner by sending a call to said one mobile phone of said one questioner on the basis of the telephone number data contained in said one mediation request; and, third connecting means for interconnecting the communication circuit connection established by said first connecting means and the communication circuit connection established by said second connecting means.

6. A mediation apparatus according to claim 1, wherein:
said acquiring means acquires, when said extracting means extracts a plurality of candidate data sets and said connection establishing means fails to establish said communication circuit connection, telephone number data of another mobile phone of another answerer from the plurality of candidate data sets which is extracted by said extracting means; and, said connection establishing means establishes, when said acquiring means acquires said telephone number data of said another mobile phone of said another answerer, a communication circuit connection in said mobile telecommunication network between said another mobile phone of said another answerer and said one mobile phone of said one questioner, on the basis of said telephone number data of said another mobile phone of said another answerer and said telephone number data contained in said one mediation request.

7. A mediation apparatus according to claim 1, wherein a part or whole of said mobile telecommunication network is a packet data communication network.

8. A mediation apparatus according to claim 1, wherein:
said mediation apparatus further comprises time measuring means for measuring time period during which said communication circuit connection is maintained; and,
said calculating means calculates at least one of (a) reward for said one answerer and (b) bill for said one questioner, with regard to a communication using said communication circuit connection, on the basis of said time period, in addition to an evaluation index which is stored by said evaluation index storing means linked to the candidate data set corresponding to said one answerer.

9. A mediation apparatus according to claim 1, wherein:
said mediation apparatus further comprises reply index storing means for storing a reply index which is made on the basis of, at least one of (a) number of times of failures of communication circuit connections between said one mobile phone of said one answerer and any mobile phone of any questioner and (b) number of times of successes of communication circuit connections between said one mobile phone of said one answerer and any mobile phone of any questioner, during a certain period of time in the past, linked to the candidate data set corresponding to said one answerer which is stored by said candidate data storing means; and,
said calculating means calculates at least one of (a) reward for said one answerer and (b) bill for said one questioner, with regard to a communication using said communication circuit connection, on the basis of a reply index which is stored by said reply index storing means linked to the candidate data set corresponding to said one answerer, in addition to an evaluation index which is stored by said evaluation index storing means linked to the candidate data set corresponding to said one answerer.

10. A mediation method comprising:
a registration request transmitting step for transmitting a registration request, which contains telephone number data and answer field data, from each of a plurality of mobile phones of answerer candidates to a mediation apparatus via a mobile telecommunication network;
a candidate data storing step for storing candidate data sets, each of which contains telephone number data and answer field data which are contained in a registration request transmitted in said registration request transmitting step;
a mediation request transmitting step for transmitting a mediation request, which contains telephone number data and question field data, from each of a plurality of mobile phones of questioners to said mediation apparatus via said mobile telecommunication network;
an extracting step for extracting, when one mediation request is transmitted from one mobile phone of one questioner to said mediation apparatus, one or more candidate data sets which contain answer field data corresponding to question field data which is contained in said one mediation request, from candidate data sets stored in said candidate data storing step;
an acquiring step for acquiring telephone number data of one mobile phone of one answerer from candidate data sets which are extracted in said extracting step;
a connection establishing step for establishing a communication circuit connection in said mobile telecommunication network between said one mobile phone of said one answerer and said one mobile phone of said one questioner, on the basis of said telephone number data acquired in said acquiring step and said telephone number data contained in said one mediation request;
an evaluation data transmitting step for transmitting evaluation data, which indicates evaluation of said one answerer, from said one mobile phone of said one questioner to said mediation apparatus via said mobile telecommunication network;
an evaluation index storing step for storing an evaluation index, which is made on the basis of said evaluation data which indicates evaluation of said one answerer, linked to a candidate data set corresponding to said one answerer which is stored in said candidate data storing step; and,
a calculating step for calculating at least one of (a) reward for said one answerer and (b) bill for said one questioner, with regard to a communication using said communication circuit connection, on the basis of an evaluation index which is stored in said evaluation index storing step, linked to the candidate data set corresponding to said one answerer.

* * * * *